US011887780B2

(12) United States Patent
Aoyama et al.

(10) Patent No.: US 11,887,780 B2
(45) Date of Patent: Jan. 30, 2024

(54) CONVEYANCE APPARATUS, SAMPLE ANALYSIS SYSTEM INCLUDING THE SAME, AND SAMPLE PREPROCESSING APPARATUS

(71) Applicant: Hitachi High-Tech Corporation, Tokyo (JP)

(72) Inventors: Yasuaki Aoyama, Tokyo (JP); Hiroyuki Kobayashi, Tokyo (JP); Satoru Kaneko, Tokyo (JP); Takeshi Tamakoshi, Tokyo (JP); Ryosuke Hoshi, Tokyo (JP); Katsuhiro Kambara, Tokyo (JP); Hiroshi Watanabe, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 503 days.

(21) Appl. No.: 17/287,899

(22) PCT Filed: Nov. 7, 2019

(86) PCT No.: PCT/JP2019/043599
§ 371 (c)(1),
(2) Date: Apr. 22, 2021

(87) PCT Pub. No.: WO2020/137182
PCT Pub. Date: Jul. 2, 2020

(65) Prior Publication Data
US 2021/0398723 A1 Dec. 23, 2021

(30) Foreign Application Priority Data
Dec. 27, 2018 (JP) ................................ 2018-244154

(51) Int. Cl.
*H01F 7/06* (2006.01)
*B65G 54/02* (2006.01)
(Continued)

(52) U.S. Cl.
CPC .............. *H01F 7/064* (2013.01); *B65G 54/02* (2013.01); *G01N 35/028* (2013.01); *H01F 7/02* (2013.01); *G01N 2035/0477* (2013.01)

(58) Field of Classification Search
CPC ........... H01F 7/064; H01F 7/02; B65G 54/02; G01N 35/028; G01N 2035/0477;
(Continued)

(56) References Cited

U.S. PATENT DOCUMENTS

| 6,650,082 B1 | 11/2003 | Du | |
|---|---|---|---|
| 2005/0174711 A1* | 8/2005 | Nagai | .................... H01H 71/26 361/93.1 |

(Continued)

FOREIGN PATENT DOCUMENTS

| JP | 5-153704 A | 6/1993 |
|---|---|---|
| JP | 2016-171669 A | 9/2016 |

(Continued)

OTHER PUBLICATIONS

Dairoku Noriyuki; Title: method and apparatus for controlling planar magnetic repellent/attractive levitation control; Date: Jun. 18, 1993; Entire specification and drawings (Year: 1993).*

(Continued)

*Primary Examiner* — Dharti H Patel
(74) *Attorney, Agent, or Firm* — Crowell & Moring LLP

(57) ABSTRACT

The present invention comprises: an object to be conveyed that has at least one permanent magnet 10; a magnetic pole 25 that has a core 22 comprising a second magnetic body and a winding 21 wound around the outer periphery of the core 22; a drive circuit 50 for supplying a current to the winding 21 of the magnetic pole 25; a current detection unit 30 for detecting the value of the current flowing through the winding 21; and a computation unit 40 for estimating the position of the permanent magnet 10 on the basis of the current value detected by the current detection unit 30 and controlling the value of the current supplied from the drive circuit 50 to the winding 21 on the basis of information about the estimated position of the permanent magnet 10.

13 Claims, 24 Drawing Sheets

(51) Int. Cl.
*G01N 35/02* (2006.01)
*H01F 7/02* (2006.01)
*G01N 35/04* (2006.01)

(58) Field of Classification Search
CPC .... G01N 35/04; H02K 11/225; H02K 41/031; H02K 2201/18; H02P 25/064
USPC ......................................................... 361/147
See application file for complete search history.

(56) References Cited

U.S. PATENT DOCUMENTS

| | | |
|---|---|---|
| 2014/0234065 A1 | 8/2014 | Heise et al. |
| 2016/0268883 A1 | 9/2016 | Kakihara et al. |
| 2017/0101277 A1 | 4/2017 | Malinowski |

FOREIGN PATENT DOCUMENTS

| | | |
|---|---|---|
| JP | 2017-77971 A | 4/2017 |
| JP | 2017-102103 A | 6/2017 |

OTHER PUBLICATIONS

Chinese-language Office Action issued in Chinese Application No. 201980067506.5 dated Jun. 29, 2023 with English translation (16 pages).

Makino S., "Research on Magnet-Saving Linear Synchronous Motors for Long-Stroke Application", Internet, Mar. 20, 2018, http://hdl.handle.net/10069/39060, (132 pages).

Murakami, S. et al., "Encoderless Servo Drive with Adequately Designed IPMSM for Pulse-Voltage-Injection-Based Position Detection", IEEE Transactions on Industry Applications, 2012, pp. 1922-1930. vol. 48, No. 6, (9 pages).

International Search Report (PCT/ISA/210) issued in PCT Application No. PCT/JP2019/043599 dated Dec. 24, 2019 with English translation (five (5) pages).

Japanese-language Written Opinion (PCT/ISA/237) issued in PCT Application No. PCT/JP2019/043599 dated Dec. 24, 2019 (four (4) pages).

Extended European Search Report issued in European Application No. 19904644.2 dated Sep. 9, 2022 (14 pages).

* cited by examiner

CONVEYANCE APPARATUS, SAMPLE ANALYSIS SYSTEM INCLUDING THE SAME, AND SAMPLE PREPROCESSING APPARATUS

TECHNICAL FIELD

The present invention relates to a conveyance apparatus suitable for a sample analysis system that analyzes, for example, a biological sample (described as a sample below) such as blood or urine, and for a sample preprocessing apparatus that performs preprocessing necessary for analysis, and the sample analysis system and the sample preprocessing apparatus including the conveyance apparatus.

BACKGROUND ART

As an example of a laboratory sample delivery system and the corresponding operation method that are highly flexible and provide high conveyance performance, PTL 1 discloses that there are provided several container carriers, a conveyance plane, and several electromagnetic actuators. Each of the container carriers includes at least one magnetically active device, preferably, at least one permanent magnet, and is adapted to carry a sample container. The conveyance plane is adapted to carry the container carriers. The electromagnetic actuators are arranged stationary below the conveyance plane and are adapted to move the container carriers on the conveyance plane by applying a magnetic force to the container carriers.

Further, as an example of a laboratory sample distribution system having operation parameters optimized in relation to a sample distribution system in the related art, PTL 2 discloses that a laboratory sample distribution system includes a plurality of electromagnetic actuators, each of the electromagnetic actuators includes a ferromagnetic core and an exciting winding, and each exciting winding exceeds the assigned ferromagnetic core.

CITATION LIST

Patent Literature

PTL 1: JP 2017-77971 A
PTL 2: JP 2017-102103 A

SUMMARY OF INVENTION

Technical Problem

In the sample analysis system for clinical tests, tests of the specified analysis items are performed on samples such as blood, plasma, serum, urine, and other body fluids.

In the sample analysis system, devices having a plurality of functions can be connected to automatically process each process. That is, in order to streamline the work of the laboratory, an analysis unit for a plurality of analysis fields such as biochemistry and immunity, and a preprocessing unit that performs preprocessing necessary for analysis are connected by a conveyance line and operate as one system.

The conveyance line used in the sample analysis system in the related art is mainly a belt drive system. In such a belt drive system, there is a problem that, when the conveyance is stopped due to some problems during the conveyance, it is not possible to supply the sample to the device on the downstream side. Therefore, it is necessary to pay sufficient attention to the wear of the belt.

With the advancement of medical care and the aging society, the importance of sample processing is increasing. Thus, in order to improve the analysis processing capacity of the sample analysis system, high-speed conveyance, mass simultaneous conveyance, and conveyance in a plurality of directions are desired.

As an example of a technology for realizing such conveyance, there are the technologies disclosed in PTLs 1 and 2.

In the technologies disclosed in PTLs 1 and 2, a container carrier detection device that detects the position of the magnetically active device provided on the sample conveyance carrier is provided.

In PTL 1, the container carrier detection device is provided in order to detect the presence and the position of the container carrier located on the conveyance plane. Further, a printed circuit board including a plurality of IR-based reflected light barriers arranged on the top in the form of a grid is provided.

In PTL 2, the laboratory sample distribution system includes a transfer surface. In addition, a plurality of electromagnetic actuators are arranged below the transfer surface. Further, a plurality of position sensors are distributed over the transfer surface. The position sensor is embodied as a Hall sensor.

However, in PTLs 1 and 2 described above, in the above systems, a plurality of container carrier detection devices are required, and there is a concern that reliability may be reduced due to device failure. In addition, a space for arranging the detection devices is required, and thus there is a limit in size reduction.

Further, in PTLs 1 and 2, it is necessary to distribute the detection devices that detect the position over the transfer surface. Therefore, there is a restriction that the distance between the magnetically active device provided on the sample conveyance carrier and the electromagnetic actuator provided below the transfer surface is inevitably provided. Therefore, there are problems that the conveyance force is reduced and the electromagnetic actuator becomes large and heavy.

The present invention provides a conveyance apparatus that has high reliability, a small size, and a light weight, and a sample analysis system and a sample preprocessing apparatus including the conveyance apparatus.

Solution to Problem

The present invention includes a plurality of means for solving the above problems. According to an example of the present invention, a conveyance apparatus includes a first magnetic body that is provided on a conveyance target object side, two or more magnetic circuits, each including a core formed of a second magnetic body and a winding wound around an outer periphery of the core, two or more drive circuits that are provided to correspond to the magnetic circuits one by one, each supplying a current to the winding, two or more current detection units, each detecting a value of a current flowing in the winding, and a computation unit that computes a position of the first magnetic body based on the current value detected by each of the current detection units, and controls the current supplied from each of the drive circuits to the winding on the basis of position information of the first magnetic body obtained by the computation. Each of the current detection units is a resistor connected to the winding. The computation unit controls the drive circuit to apply a pulse voltage having at least two or more different frequencies and detects a current from a voltage value of the resistor, sets the pulse voltage applied to compute the position of the first magnetic body in the pulse voltage applied by the drive circuit, to be equal to or lower than a voltage used to drive the first magnetic body, stores, in advance, a relational expression for determining a relation between a current waveform generated by the pulse voltage, and a distance, or table data for determining the relation between the current waveform and the distance, and detects inductance from the current waveform and computes the position of the first magnetic body from any one or more of a difference in inductance between the adjacent windings, a slope of the inductance of each of the windings, and a value of the inductance.

Advantageous Effects of Invention

According to the present invention, it is possible to provide a conveyance apparatus that has high reliability, a small size, and a light weight. Objects, configurations, and effects other than those described above will be clarified by the descriptions of the following embodiments.

DESCRIPTION OF EMBODIMENTS

Hereinafter, examples of a conveyance apparatus of the present invention, and a sample analysis system and a sample preprocessing apparatus including the conveyance apparatus will be described with reference to the drawings.

Example 1

Example 1 of a conveyance apparatus in the present invention will be described with reference to FIGS. 1 to 8.

Figure 1:
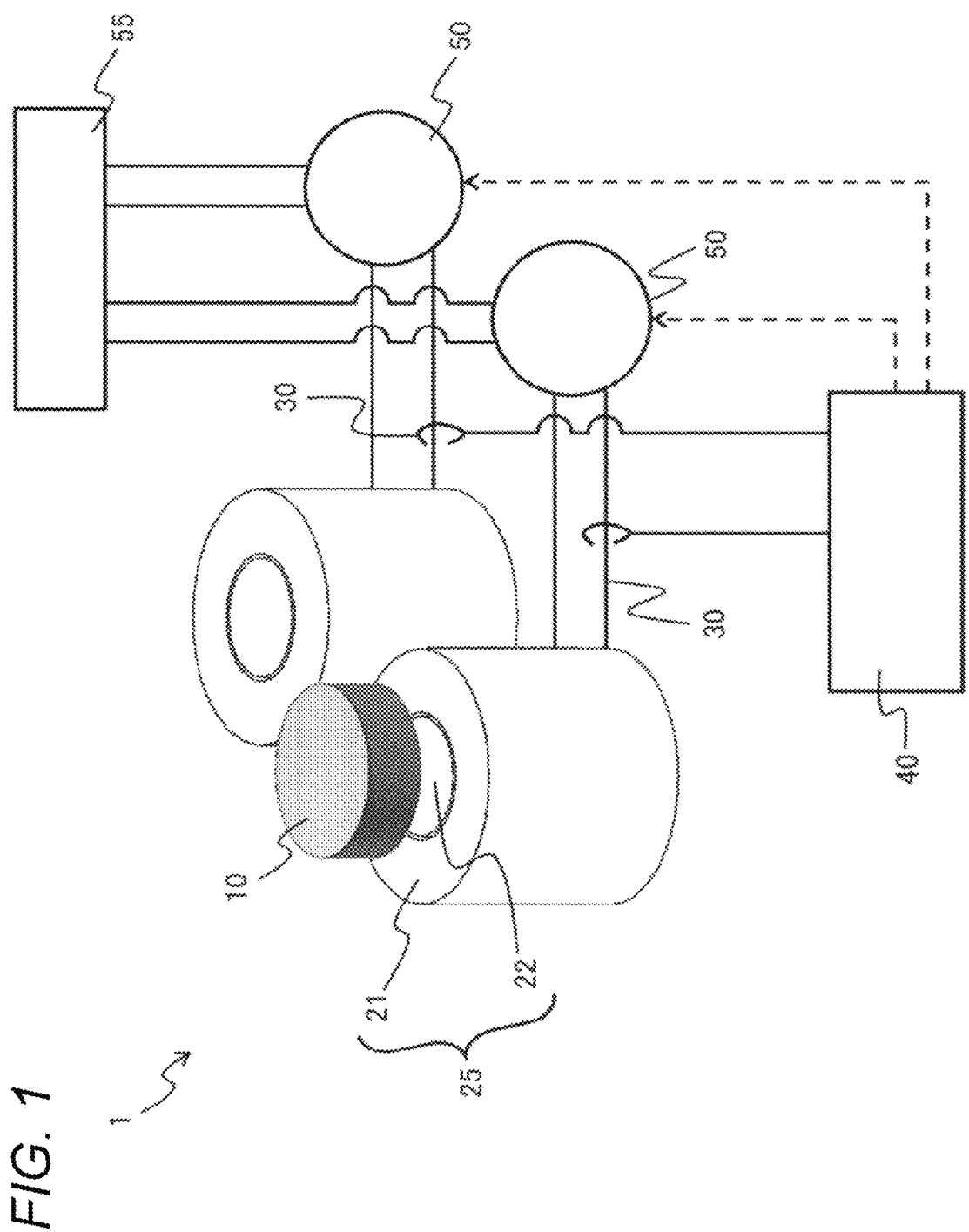
FIG. 1 is a schematic diagram illustrating a configuration of a conveyance apparatus according to Example 1 of the present invention.

Firstly, the schematic configuration of the conveyance apparatus in the present example will be described with reference to FIG. 1. FIG. 1 is a schematic diagram illustrating the conveyance apparatus in the present example, in which two magnetic poles 25 and a permanent magnet 10 operate relatively.

In FIG. 1, the conveyance apparatus 1 includes the permanent magnet 10, the magnetic pole 25, a drive circuit 50, a current detection unit 30, a computation unit 40, and a power supply 55. The magnetic pole is configured by a columnar core 22 and a winding 21 wound on the outer peripheral side of the core 22.

The permanent magnet 10 is provided on a conveyance target object side, and is preferably configured by a permanent magnet such as neodymium or ferrite. However, the permanent magnet 10 can also be configured by other magnets and soft magnetic bodies. Further, the permanent magnet 10 and a soft magnetic body may be combined, or a magnetic body may be used instead of the permanent magnet.

Figure 27:
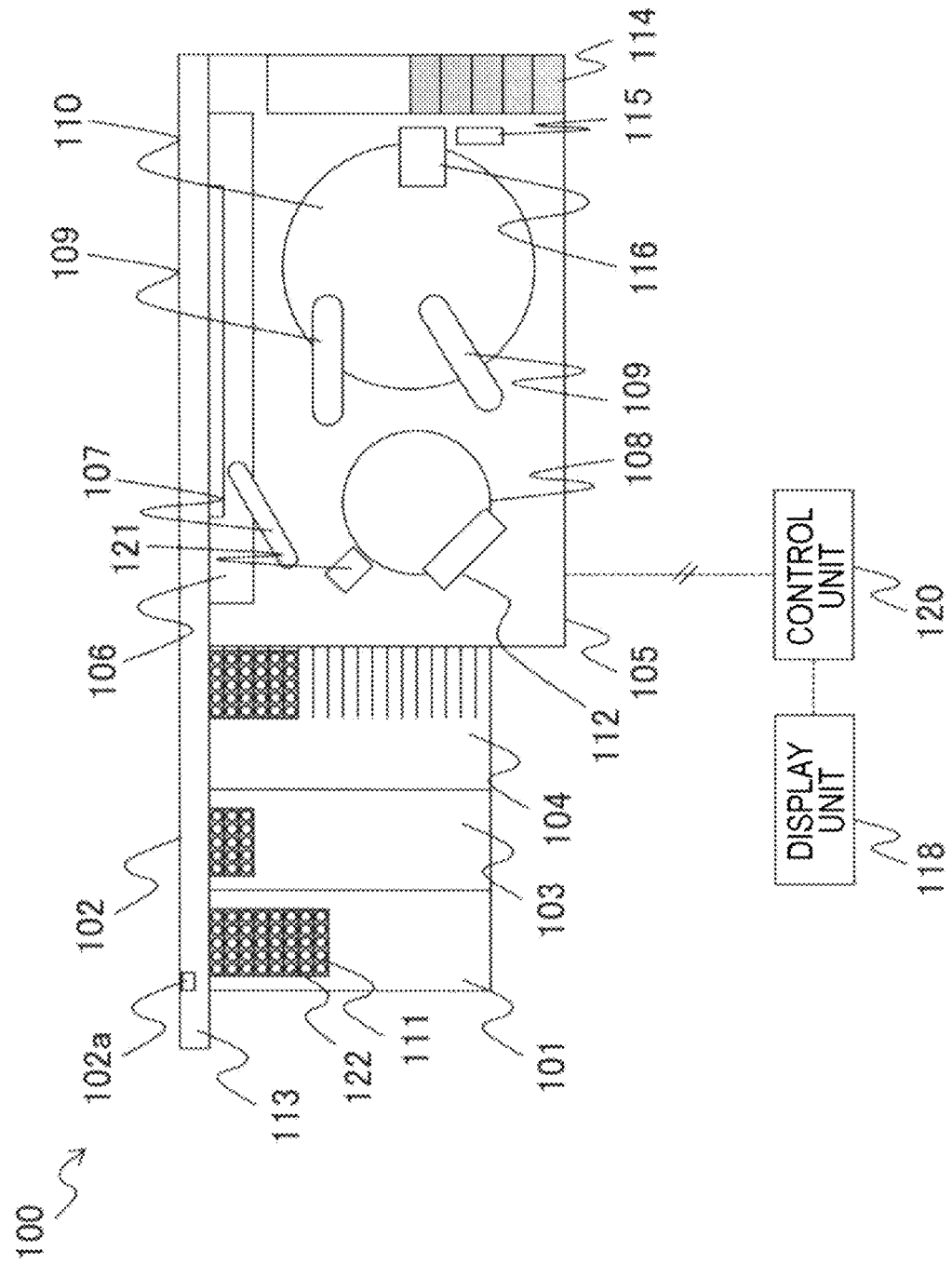
FIG. 27 is a diagram illustrating an example of a sample analysis system according to Example 4 of the present invention.

As an example of the conveyance target object provided with the permanent magnet 10, there is a sample holder and a sample rack 111 for holding a plurality of samples (see FIG. 27). In the above example, one sample container 122 (see FIG. 27) into which a sample is put is mounted on the sample holder, and the sample holder is conveyed to a desired position while the permanent magnet 10 moves. That is, the sample container 122 and the sample holder that holds the sample container 122, and the permanent magnet 10 are configured to be integrated. The sample container 122 and the holder are conveyed to a desired position by conveying the permanent magnet 10.

Normally, a conveyance surface (not illustrated) for supporting the permanent magnet 10 is provided between the magnetic pole 25 and the permanent magnet 10, and the permanent magnet 10 slides on the conveyance surface.

As illustrated in FIG. 1, the conveyance apparatus 1 includes at least two or more magnetic poles 25. Each of the magnetic poles 25 includes a core 22 formed of a magnetic body and a winding 21 wound around the outer periphery of the core 22. The columnar core 22 of the magnetic poles 25 is disposed to face the permanent magnet 10.

In the conveyance apparatus 1, a current flows in the winding 21, and thereby an electromagnetic force is caused to act on the permanent magnet 10, and the permanent magnet is moved between the magnetic poles 25. In order to cause the electromagnetic force to efficiently act and move in a desired direction, relative position information between the permanent magnet 10 and the magnetic pole 25 is required. For example, when the permanent magnet 10 is directly above one of the two magnetic poles 25, no force is generated in a conveyance direction even though a current flows in the magnetic poles 25 directly below the permanent magnet 10. On the contrary, the current flows in the magnetic pole 25 directly above which the permanent magnet 10 is not located, and thereby it is possible to generate a force for attracting the permanent magnet 10 to the magnetic pole 25. That is, it is possible to efficiently generate the force and control the direction of the force.

When the permanent magnet 10 is located above the magnetic pole 25 on the front side in FIG. 1, the magnetic flux generated by the permanent magnet 10 acts on the magnetic pole 25. Here, the magnitude of the magnetic flux acting on the magnetic flux is different between the magnetic pole 25 on a near side of the permanent magnet 10 and the magnetic pole 25 on a far side. That is, the magnitude of the magnetic flux acting on the magnetic pole 25 changes depending on the relative position between the permanent magnet 10 and the magnetic pole 25.

The core 22 is made of a magnetic body, and the magnetic flux passing through the core 22 has a property that it becomes difficult to pass as the magnetic flux increases. Here, when a voltage is applied to the winding 21 and a current flows, the magnetic flux generated by the current is generated in the core 22. Thus, the magnetic flux generated by the permanent magnet 10 and the magnetic flux generated by the current flowing in the winding 21 are generated in the core 22.

Generally, when the current flows in the winding 21, a magnetic field is generated around the winding, and the generated magnetic flux is proportional to the flowing current value. The proportionality constant is referred to as inductance. However, in a circuit including a magnetic body such as the core 22, the inductance changes by the saturation characteristic of the core 22.

When the core 22 is saturated, the inductance changes depending on the magnitude of the magnetic flux generated in the core 22. That is, the inductance of the winding 21 changes depending on the magnitude of the magnetic flux of the permanent magnet 10. This means that the inductance of the winding 21 changes depending on the position of the permanent magnet 10.

A voltage V generated in the winding 21 is represented below.

$$V = -d\varphi/dt \quad (1)$$

Here, $\varphi$ is magnetic flux, and t is time. The voltage V is represented by the amount of change in magnetic flux per unit time.

Further, when a current is set as I, and the inductance is set as L, a relation as follows is established.

$$dI/dt = (1/L) \times (d\varphi/dt) \quad (2)$$

From the expressions (1) and (2), a relation of $$dI/dt = -V/L \quad (3)$$

is established.

That is, when a constant voltage is applied to the winding 21, the time derivative of the supplied current I changes depending on the magnitude of the inductance L as shown in Expression (3). This means that a rising form of the current supplied when the voltage is applied differs.

Thus, when the voltage is applied to the winding 21, by detecting the current flowing in the winding 21 and a flowing form, the inductance L can be obtained by the computation. That is, when the inductance L of the winding 21 that changes depending on the position of the permanent magnet 10 is detected, the position of the permanent magnet 10 having an influence on the inductance can be obtained.

Therefore, the drive circuit 50 is connected to the winding 21 of the magnetic pole 25, and the current detection unit 30 that detects the value of the current flowing in the winding 21 is provided. In the present example, the voltage is applied to the winding 21 by the drive circuit 50, and the current value generated by the voltage is detected by the current detection unit 30.

The current detection unit 30 for detecting the current may be a series resistor, for example, one using a current transformer, one using a Hall current sensor, or the like, but is not limited thereto.

Figure 2:
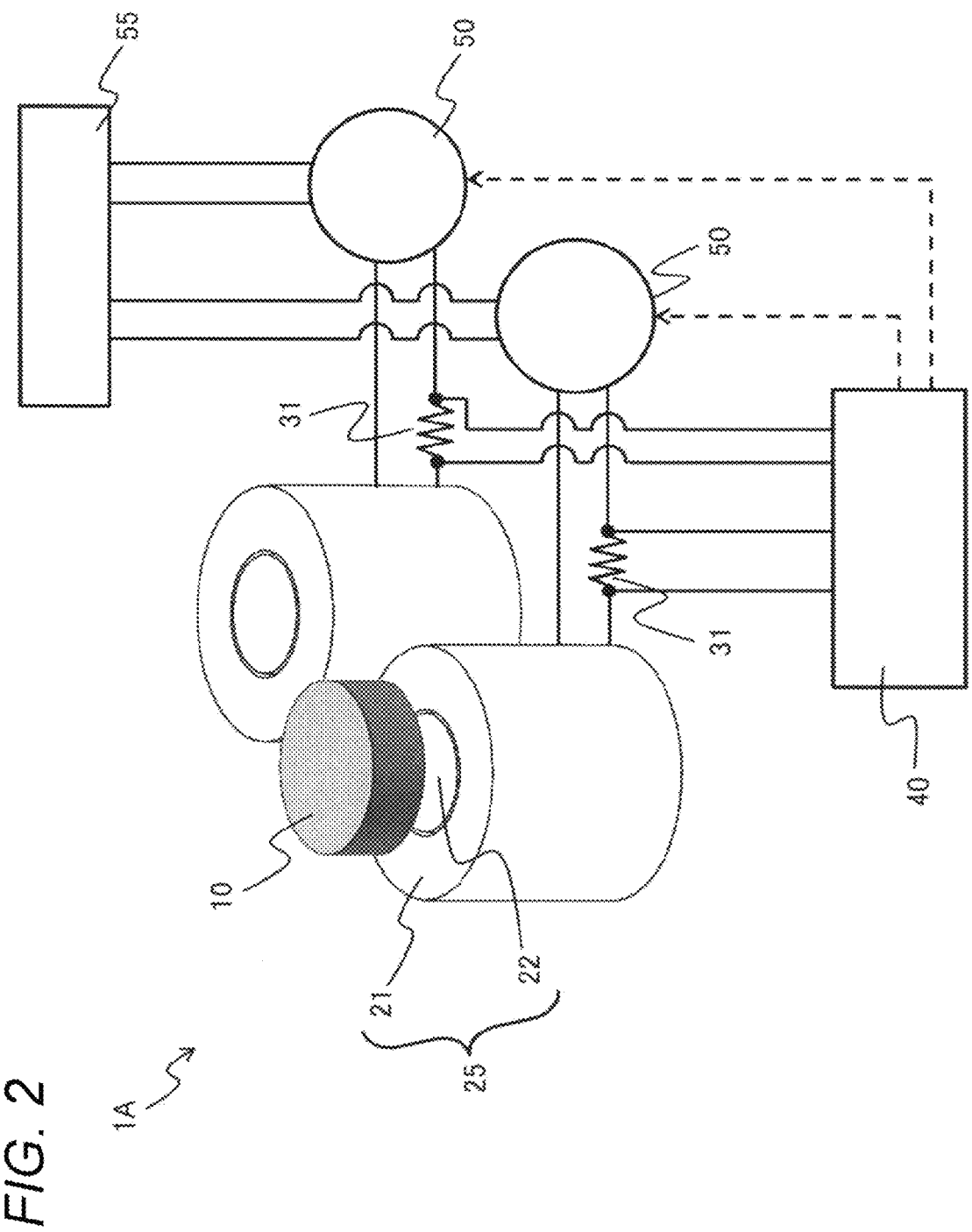
FIG. 2 is a diagram illustrating an example of a specific configuration of a current detection unit in the conveyance apparatus in Example 1.

A specific example of the current detection unit 30 will be described below with reference to FIG. 2. FIG. 2 is a schematic diagram illustrating an example of a specific example of the configuration for current detection.

In a conveyance apparatus 1A in two magnetic poles 25 and a permanent magnet 10 operate relative to each other as illustrated in FIG. 2, the magnetic pole 25 is configured by a columnar core 22 and a winding 21 wound on the outer peripheral side of the core 22. In addition, the permanent magnet 10 is disposed to face the columnar core 22. A drive circuit 50 is connected to the winding 21.

Further, a resistor 31 for detecting the current flowing in the winding 21 is provided between the winding 21 and the drive circuit 50.

Returning to FIG. 1, the drive circuit 50 is connected to an AC power source or a DC power source 55 such as a battery. The drive circuit 50 receives a current from the power supply 55 and supplies a current to the winding 21 of the magnetic pole 25.

The computation unit 40 computes the relative positional relation between the core 22 and the permanent magnet 10 on the basis of the current value detected by the current detection unit 30, and computes the position of the permanent magnet 10 in the conveyance apparatus 1. Further, the computation unit uses the computed position information of the permanent magnet 10 to determine the timing for supplying a current necessary for driving the permanent magnet 10 from the drive circuit 50, and supplies the current to the appropriate winding 21.

In the present embodiment, in particular, the computation unit 40 applies a pulse voltage 60 to the winding 21, and computes the position of the permanent magnet 10 from a current waveform generated by the pulse voltage 60, more specifically, from the amount of change in the current. The details will be described later.

Thus, it is not necessary to install any sensor between the permanent magnet 10 and the magnetic pole 25. Thus, it is possible to reduce a distance between the permanent magnet 10 and the magnetic pole 25, to reduce a possibility of a problem occurring, and to improve reliability.

Figure 3:
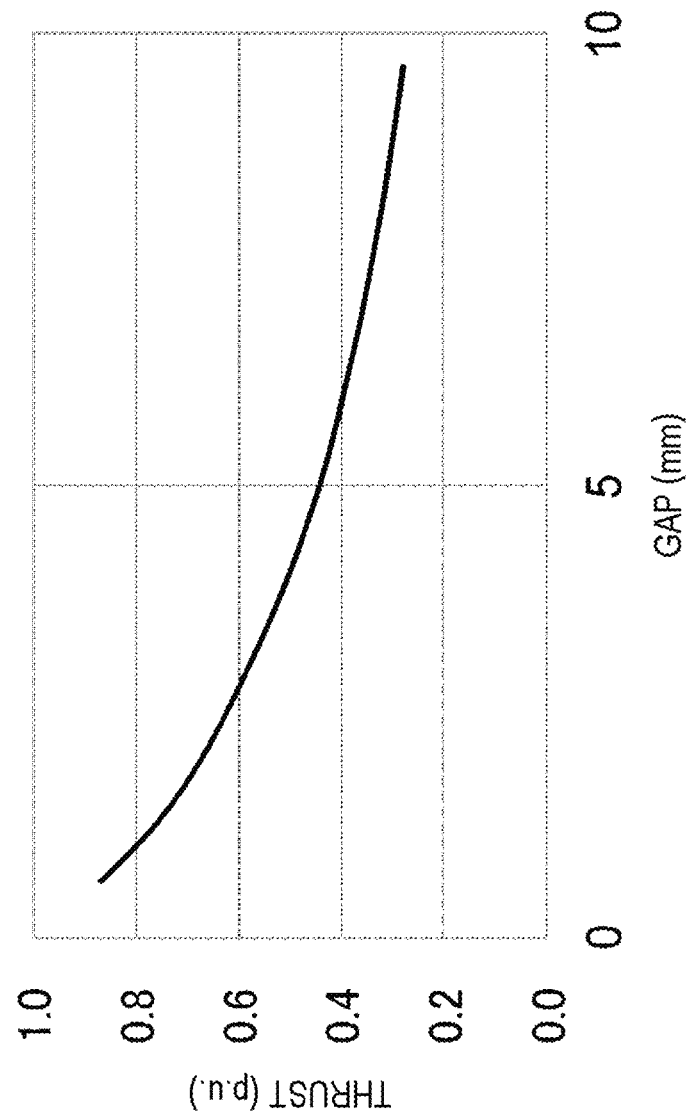
FIG. 3 is a diagram illustrating a relation between a gap between a permanent magnet and a magnetic pole and thrust acting on the permanent magnet.

Here, FIG. 3 illustrates the relation between a gap between the permanent magnet 10 and the magnetic pole 25 and the thrust acting on the permanent magnet 10. The gap is calculated by magnetic field analysis.

As illustrated in FIG. 3, as the gap between the permanent magnet 10 and the magnetic pole 25 is reduced, the thrust acting on the permanent magnet 10 can increase. Thus, from the relation illustrated in FIG. 3, it is desirable that the gap is set to be equal to or less than 10 [mm]. Accordingly, it is possible to sufficiently secure the thrust for conveying the permanent magnet 10 and the sample container 122.

In the related art, it is necessary to bury the container carrier detection device in the conveyance surface between the permanent magnet 10 and the magnetic pole 25, and thus there is a limit to reducing the gap between the permanent magnet 10 and the magnetic pole 25.

On the other hand, in the conveyance apparatus 1 in the present embodiment in which the position of the permanent magnet 10 is detected using the inductance of the winding 21, it is possible to reduce the gap between the permanent magnet 10 and the magnetic pole 25. Therefore, it is possible to increase the thrust as compared with the technology in the related art. Further, a plurality of detection devices are not required, and thus it is possible to prevent the stop of the conveyance apparatus due to a problem or the like in the detection device.

Figure 4:
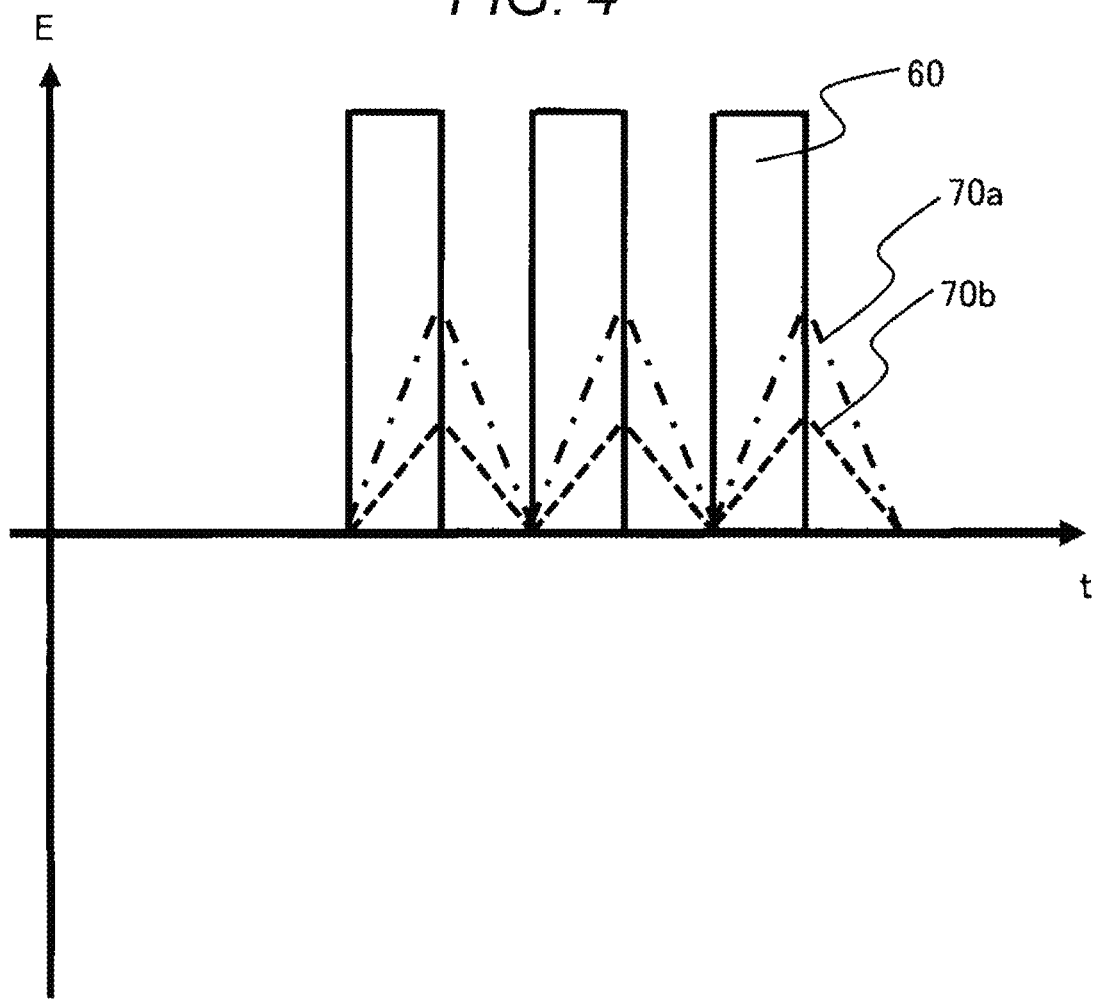
FIG. 4 is a schematic diagram illustrating a shape of a current waveform depending on magnitude of inductance in the conveyance apparatus in Example 1.

Next, the voltage applied to the winding 21 and the current waveform generated by the voltage will be described with reference to FIG. 4. FIG. 4 schematically illustrates the shape of the current waveform depending on the magnitude of the inductance.

As illustrated in FIG. 4, the current waveform when the pulse voltage 60 is applied to the winding 21 changes depending on the magnitude of the inductance.

For example, when the inductance is small, the current rises quickly, and thus a shape like a current waveform 70a is obtained. On the other hand, when the inductance is large, the current rises slowly, and thus a shape like a current waveform 70b is obtained. That is, it is possible to detect the inductance, that is, information regarding the position of the permanent magnet 10 by detecting the current change when a certain voltage, in particular, the pulse voltage 60 is applied.

Figure 5:
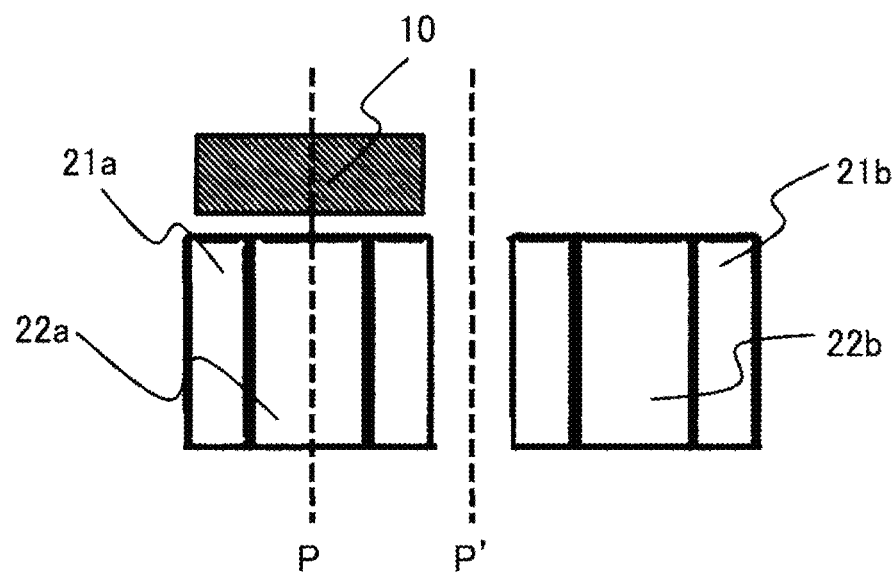
FIG. 5 is a schematic diagram illustrating a cross section of the conveyance apparatus in Example 1 illustrated in FIG. 1.
Figure 6:
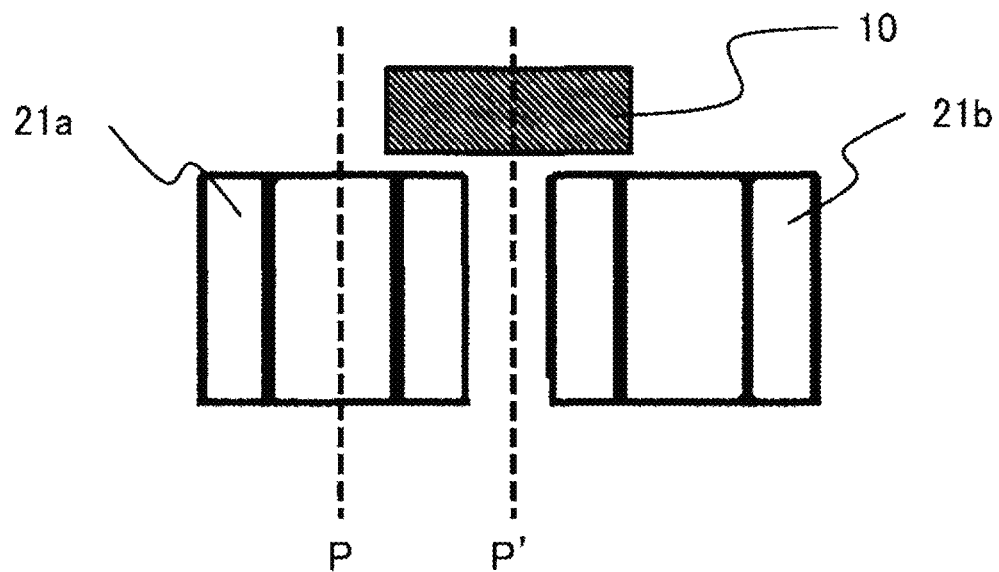
FIG. 6 is a schematic diagram illustrating the cross section of the conveyance apparatus in Example 1 illustrated in FIG. 1.

The relative position between the magnetic pole 25 and the permanent magnet 10 and inductances will be described with reference to FIGS. 5 and 6. FIGS. 5 and 6 are schematic diagrams illustrating a cross section of the conveyance apparatus 1 illustrated in FIG. 1. The inductance when the permanent magnet 10 is at a position P and a position P' will be described below.

In the case of FIG. 5, the permanent magnet 10 is located at the position P directly above the winding 21a and the core 22a. At this time, the magnetic flux generated by the permanent magnet 10 is generated in both the core 22a and the core 22b. However, since the permanent magnet 10 is directly above the core 22a, the magnetic flux generated for the core 22a by the permanent magnet 10 is smaller than the magnetic flux generated for the core 22b by the permanent magnet 10. Therefore, the inductances of the winding 21a and the winding 21b are different.

Therefore, the inductance is detected by the current change caused by the voltage applied to the winding 21, and the position of the permanent magnet 10 can be detected from the inductance.

As illustrated in FIG. 6, when the permanent magnet 10 is at the position P' between the core 22a and the core 22b, the magnetic flux generated by the permanent magnet 10 in the core 22a is almost equal to the magnetic flux generated by the permanent magnet in the core 22b. For example, when the permanent magnet 10 is moving from the position P to the position P', the position of the permanent magnet 10 is detected from the difference in inductance between adjacent windings 21, the slope of the inductance of each winding 21, and the value of the inductance. Thus, it is possible to improve the detection accuracy.

Figure 7:
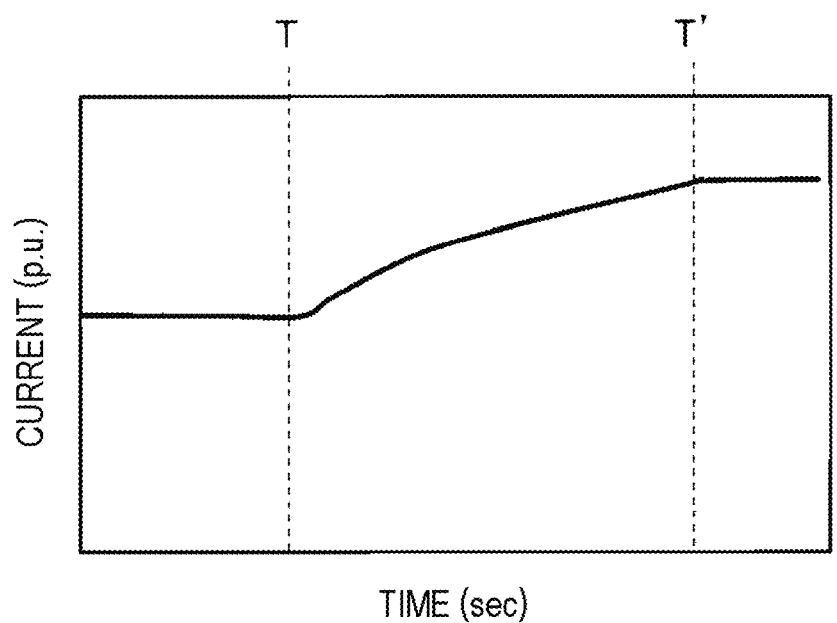
FIG. 7 is a diagram illustrating a rising state of a current waveform when a voltage is applied to a winding at a position of FIG. 5 in the conveyance apparatus in Example 1.
Figure 8:
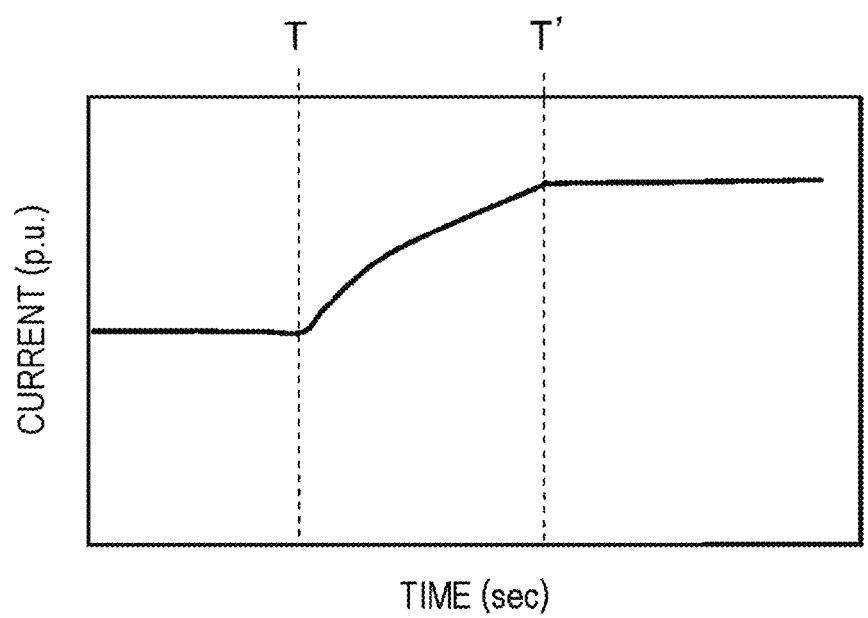
FIG. 8 is a diagram illustrating the rising state of the current waveform when the voltage is applied to the winding at the position of FIG. 5 in the conveyance apparatus in Example 1.

FIGS. 7 and 8 illustrate the rising of the current waveform when a voltage is applied to the windings 21a and 21b at the position illustrated in FIG. 5. FIG. 7 illustrates the current waveform when the voltage is applied to the winding 21a in the position relation as illustrated in FIG. 5. FIG. 8 illustrates the current waveform when the voltage is applied to the winding 21b in the position relation as illustrated in FIG. 5.

As illustrated in FIG. 7, when the permanent magnet 10 is directly above the winding 21a and the core 22a, the rising time of the current is about 0.005 seconds. On the other hand, when the permanent magnet 10 is directly above the adjacent winding 21b and core 22b as illustrated in FIG. 8, the rising time is about 0.003 seconds.

As described above, at a time point T, the rising time (time from T to T') of the current or the slop when a pulsed voltage is applied is compared. When the permanent magnet 10 is directly above and the inductance is small, the increase in current becomes gentle as illustrated in FIG. 7. On the other hand, when the permanent magnet 10 is not directly above and the inductance is large, the current increases rapidly as illustrated in FIG. 8.

That is, by detecting the current change when a pulsed voltage is applied, it is possible to detect the presence or absence and the position of the permanent magnet 10 with high accuracy. Therefore, in the present invention, by using such a principle, the position of the permanent magnet 10, that is, the position of the conveyance target object is detected without providing a detection mechanism between the magnetic pole 25 and the permanent magnet 10, and is used for conveyance control.

Therefore, it is desirable that the computation unit 40 stores, in advance, various kinds of data and relational expressions such as a relational expression and table data for determining the relation between inductance and the distance, a relational expression and table data for determining the relation between the rising time of the current and the distance.

For example, in a case of a form in which a resistor 31 connected to the winding 21 is provided as the current detection unit 30 illustrated in FIG. 2, the computation unit 40 computes information of the value of the current flowing in the winding 21, the amount of increase, and the amount of decrease on the basis of the voltage value of the resistor 31, and calculates the relative position between the core 22 and the permanent magnet 10. Then, the current flowing in the winding 21 from the drive circuit 50 is controlled based on the relative position information between the core 22 and the permanent magnet 10 computed by the computation unit 40. The resistor 31 may be able to detect the current flowing in the winding 21, and is located at any position on the circuit.

Next, the effect of the present embodiment will be described.

According to Example 1 of the present invention described above, the conveyance apparatus 1 includes the permanent magnet 10 that is provided on the conveyance target object side, the magnetic pole 25 that includes the core 22 formed of a magnetic body and the winding 21 wound around the outer periphery of the core 22, the drive circuit 50 that supplies a current to the winding 21 of the magnetic pole 25, the current detection unit 30 that detects the value of the current flowing through the winding 21, and the computation unit 40 that computes the position of the permanent magnet 10 on the basis of the current value detected by the current detection unit 30 and controls the current supplied from the drive circuit 50 to the winding 21 on the basis of information about the computed position of the permanent magnet 10.

Thus, in a magnetically driving type conveyance mechanism that has high reliability and is different from a belt driving type, it is possible to obtain the position of a conveyance target object without providing a mechanism that detects a conveyance target on the conveyance surface. Thus, it is not necessary to provide the distance between the conveyance target and the magnetic pole as compared with the technology in the related art. It is possible to sufficiently transmit the electromagnetic force for conveyance to the magnet (permanent magnet 10) on the conveyance target side. It is possible to obtain a compact and lightweight conveyance apparatus that solves various problems such as a decrease in the conveyance force and an increase in size and weight of the electromagnetic actuator as in the technology in the related art.

In addition, since the current detection unit 30 is the resistor 31 connected to the winding 21, and the computation unit 40 detects the current from the voltage value of the resistor 31, it is possible to detect the current flowing in the winding 21 with a simple configuration and high accuracy, to further improve the reliability, and to reliably reduce the size.

Further, since the computation unit 40 controls the drive circuit 50 to apply the pulse voltage 60, and computes the position of the permanent magnet 10 from the current change caused by the pulse voltage 60, it is possible to more accurately and reliably obtain the relative position relation between the magnetic pole 25 and the permanent magnet 10 and to further improve the reliability.

In addition, since the gap between the permanent magnet 10 and the core 22 is equal to or less than 10 [mm], it is possible to sufficiently transmit the conveyance force generated from the magnetic pole 25, to the permanent magnet 10 integrated with the conveyance target object, and to sufficiently secure the conveyance performance.

Example 2

A conveyance apparatus in Example 2 of the present invention will be described with reference to FIGS. 9 to 18. The same components as those in Example 1 are denoted by the same reference signs, and description thereof will not be repeated. The same will be applied in the following examples.

The conveyance apparatus in the present example has the same configuration and operation as those of the conveyance apparatuses 1 and 1A described in Example 1 except that the shapes of the magnetic pole 25A and the permanent magnet 10A are different.

Figure 9:
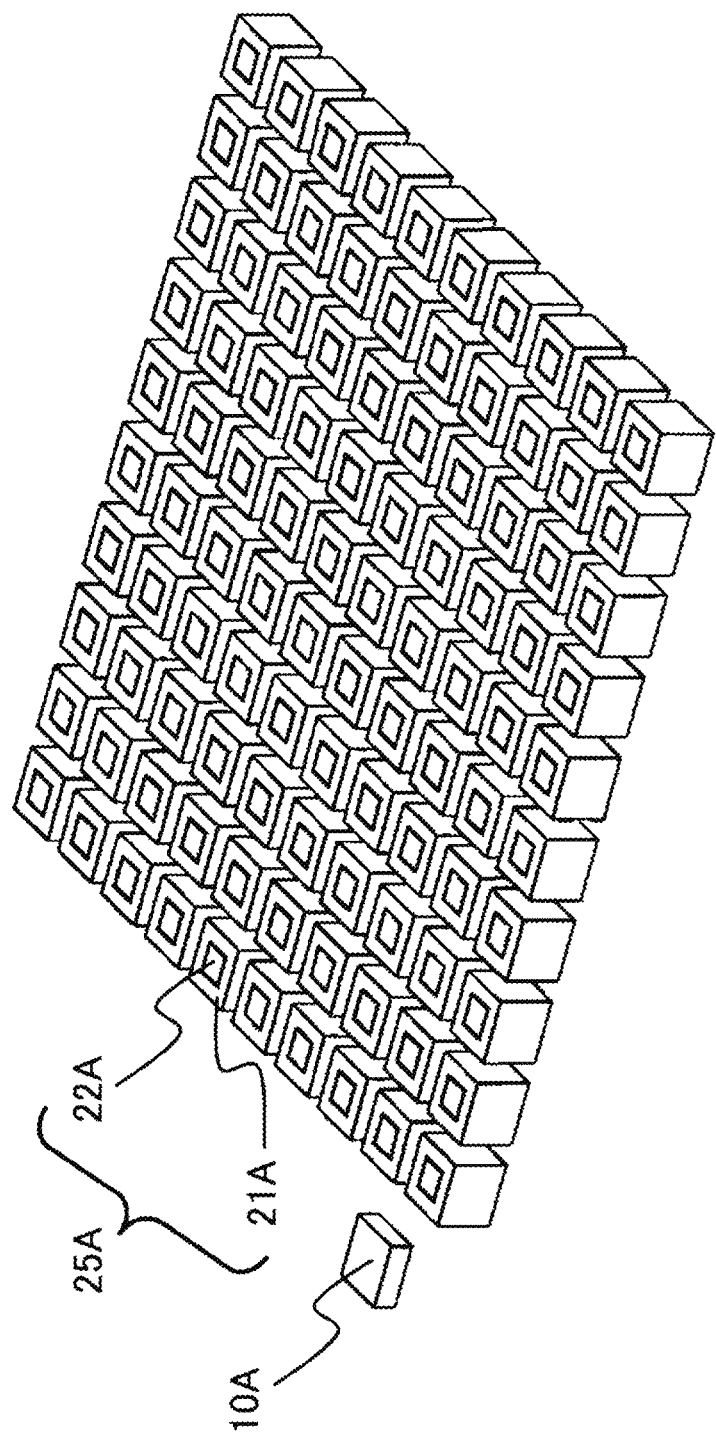
FIG. 9 is a schematic diagram illustrating a configuration of a conveyance apparatus according to Example 2 of the present invention.

As illustrated in FIG. 9, the conveyance apparatus in the present example includes two or more magnetic poles 25A. Each of the magnetic poles is configured by a prismatic core 22A and a winding 21A wound around the core 22A. A plurality of magnetic poles are arranged vertically and horizontally. In FIG. 9, magnetic poles 25A of 10×10 are provided.

In the present example, a current detection unit 30 is provided for the magnetic pole 25A on a one-to-one basis.

Further, a computation unit 40 computes the position of the permanent magnet 10A by using the current value detected by the current detection unit 30 in the same manner. In the present example, the position of the permanent magnet 10A is computed using the current value when a pulse voltage 60 is applied to the windings 21A wound around two adjacent cores 22A. The details will be described later.

In the present example, the permanent magnet 10A integrally formed with a holder and a sample container 122 has a prismatic shape. Note that, the shape is not limited to the prism. For example, the shape of the permanent magnet may be a ring shape or a combination of a plurality of magnets.

The permanent magnet 10A moves relatively on the aligned magnetic poles 25A. A conveyance surface (not illustrated) is installed above the magnetic pole 25A, and the permanent magnet 10A moves on the conveyance surface.

Since a drive circuit 50 and the current detection unit 30 that detects the current are similar to those in the other examples, illustrations and detailed descriptions thereof will not be repeated.

Figure 10:
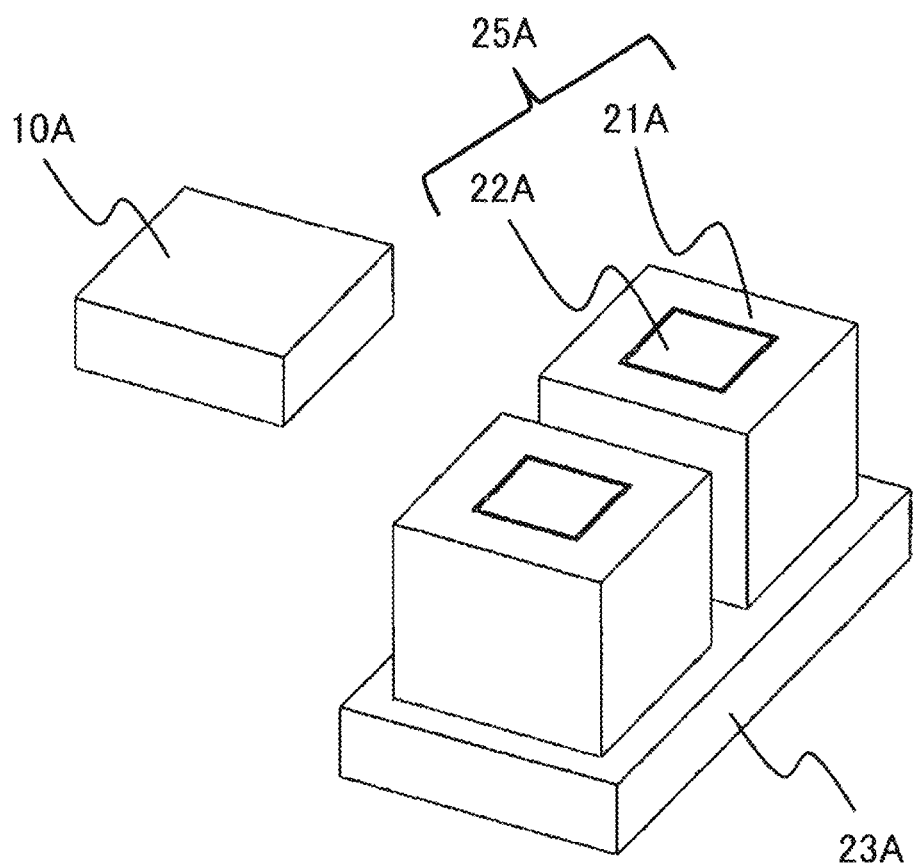
FIG. 10 is an enlarged view of a portion of the conveyance apparatus in Example 2.

FIG. 10 illustrates that two magnetic poles 25A are extracted from the plurality of magnetic poles 25A illustrated in FIG. 9. In the present example, connection is performed by a yoke 23A formed of a magnetic body, on a side of the magnetic pole 25A, that does not face the permanent magnet 10A, that is, at the lower portion of the magnetic pole 25A in FIG. 10. It is possible to increase the inductance of the winding 21 by connection using the yoke 23A.

Figure 11:
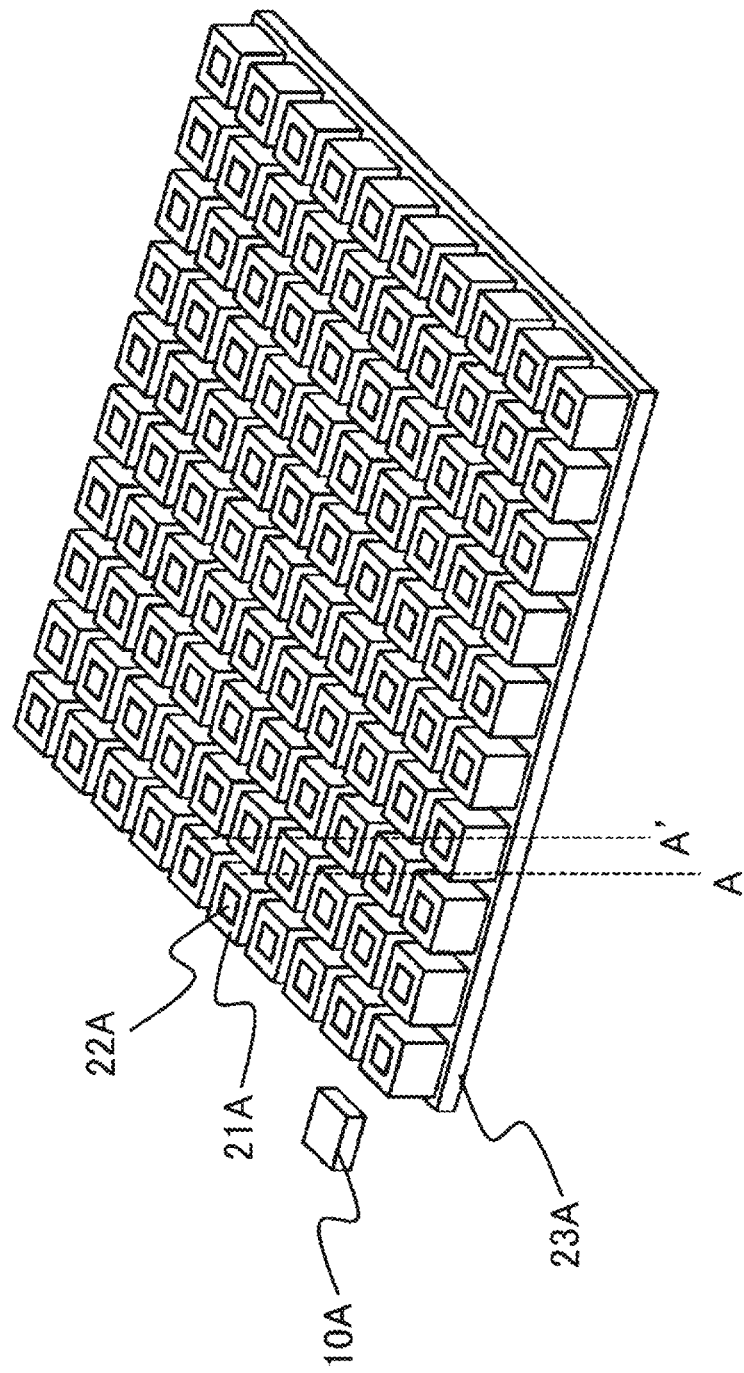
FIG. 11 is a schematic diagram illustrating a configuration of the conveyance apparatus in Example 2.

FIG. 11 is a diagram illustrating the yoke 23 at the lower portion of the magnetic pole 25A illustrated in FIG. 9. A detection method of the permanent magnet 10 in the configuration example of the present example will be described below with reference to FIGS. 12 to 18.

FIG. 11 and the like illustrate a detection example below when the permanent magnet 10A moves from a position A to a position A'.

Figure 12:
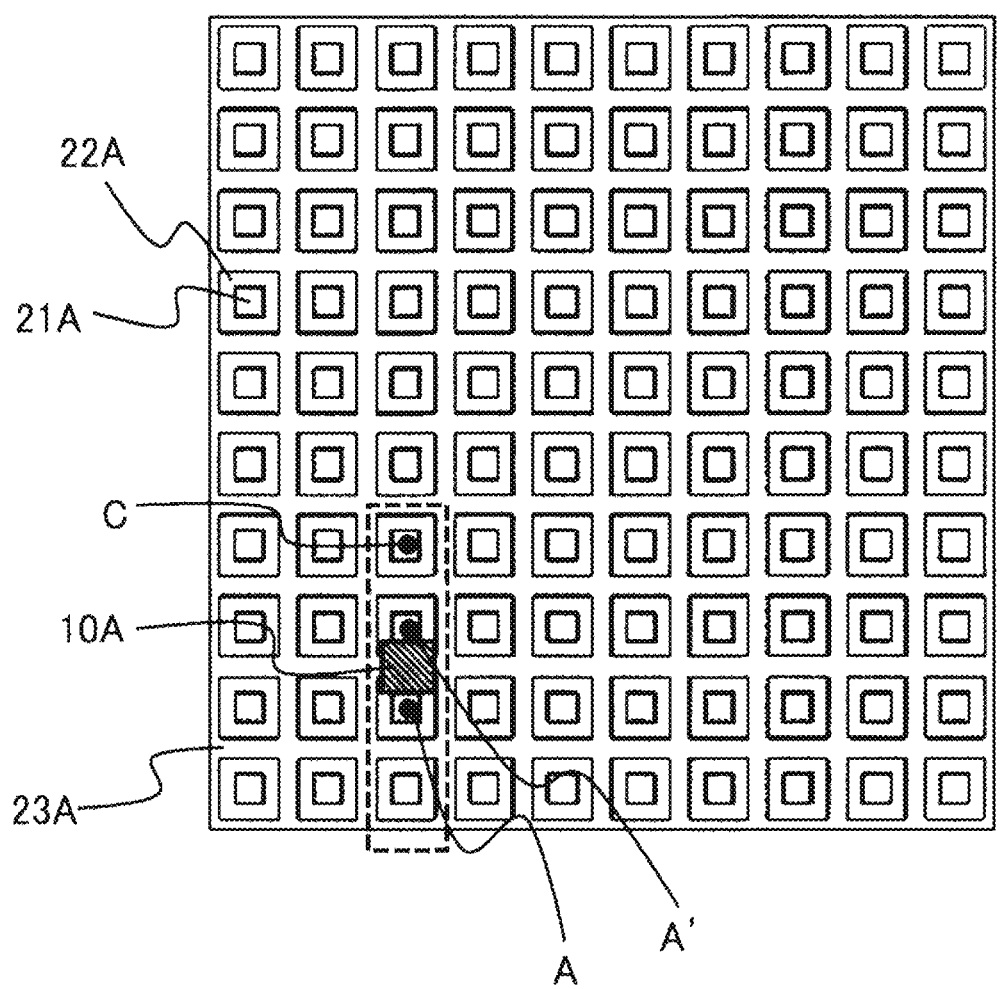
FIG. 12 is a top view of the conveyance apparatus in Example 2 illustrated in FIG. 11.
Figure 13:
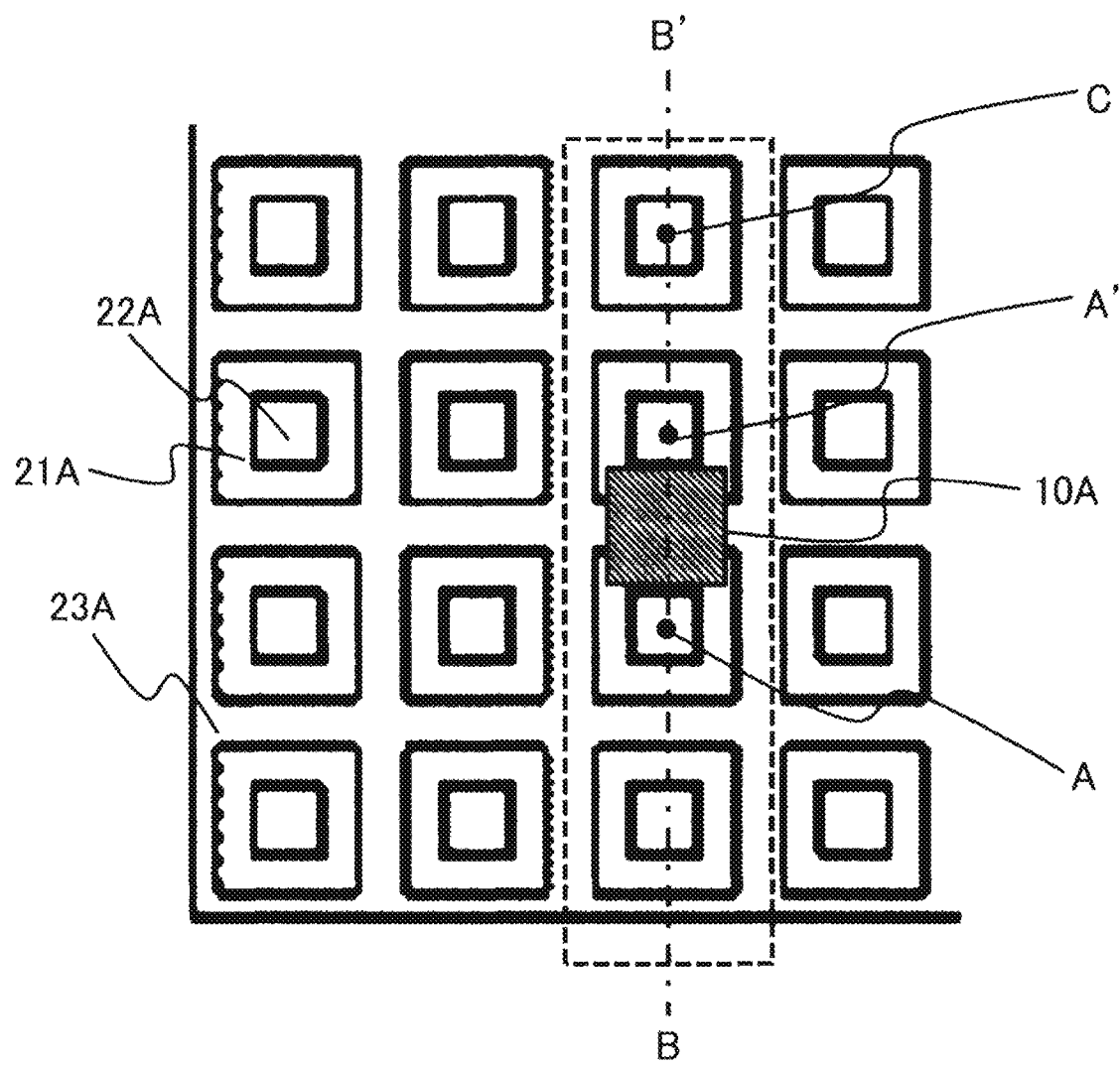
FIG. 13 is a partially-enlarged view of a conveyance portion in the conveyance apparatus in Example 2 illustrated in FIG. 11.
Figure 14:
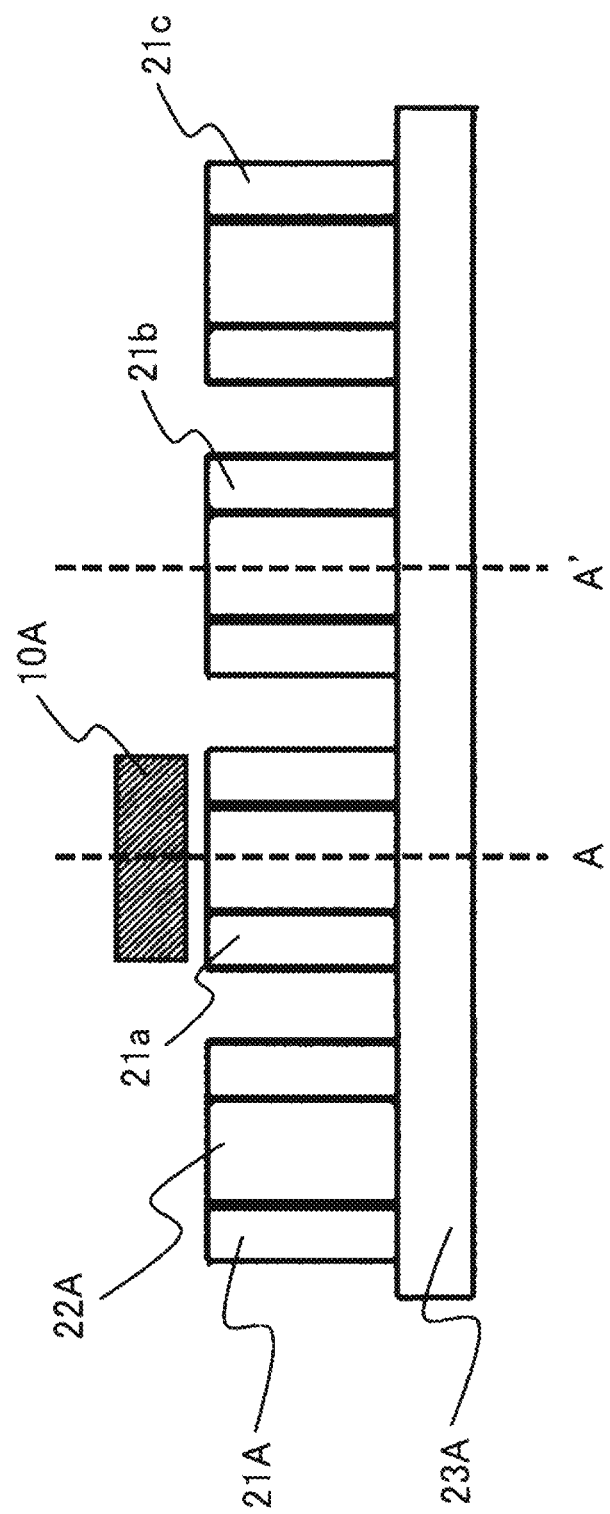
FIG. 14 is a cross-sectional view taken along line B-B' in FIG. 13.
Figure 15:
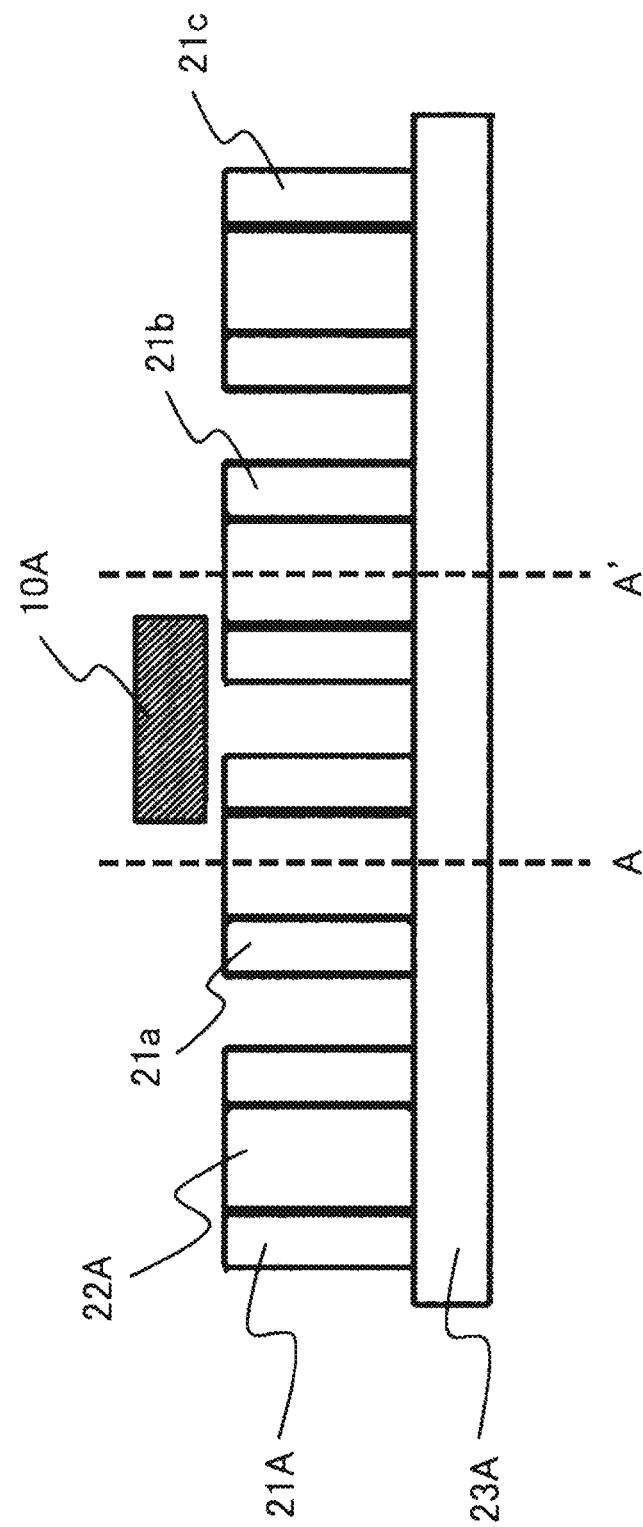
FIG. 15 is a cross-sectional view taken along the line B-B' in FIG. 13.
Figure 16:
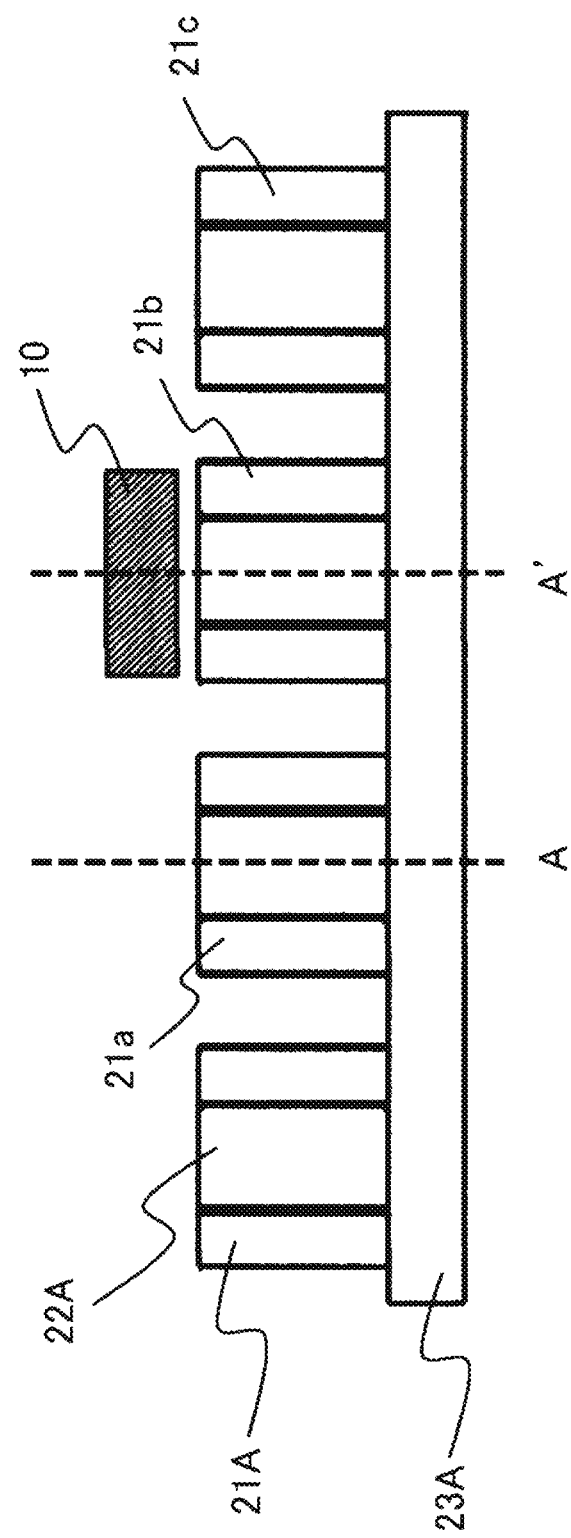
FIG. 16 is a cross-sectional view taken along the line B-B' in FIG. 13.

FIG. 12 illustrates a top view of the conveyance apparatus. FIG. 13 illustrates an enlarged view of a conveyance portion. Further, FIGS. 14, 15, and 16 illustrate schematic views cut along the B-B' cross section of FIG. 13 and viewed from the side surface. Here, it is assumed that a current flows so that the magnetic flux generated by the permanent magnet 10 and the magnetic flux generated by each winding have the same direction.

As illustrated in FIG. 14, when the permanent magnet 10A is at the position A, if a current is applied so that the magnetic flux generated by the permanent magnet 10A and the magnetic flux generated by the winding 21a have the same direction, the inductance of the winding 21a is reduced. In addition, the influence of the permanent magnet 10A acts on the adjacent winding 21b, and the inductance is slightly reduced. Furthermore, in the adjacent winding 21c, there is almost no influence of the permanent magnet 10A, and no decrease in inductance is observed.

As illustrated in FIG. 15, as the permanent magnet 10A moves and approaches a space between the position A and the position A', the inductance of the winding 21a increases and the inductance of the winding 21b decreases. Further, the inductance of the winding 21c also decreases.

Then, when the permanent magnet 10A moves to the position A' as illustrated in FIG. 16, the inductance of the winding 21b is reduced, and the inductance of the adjacent winding 21a returns to almost the original value. Further, the inductance of the winding 21c begins to decrease, and the value decreases slightly.

As described above, it is possible to accurately detect the position of the permanent magnet 10 or a traveling direction by detecting a difference between the inductance of the winding near the permanent magnet 10A and the inductance of the surrounding windings.

Figure 17:
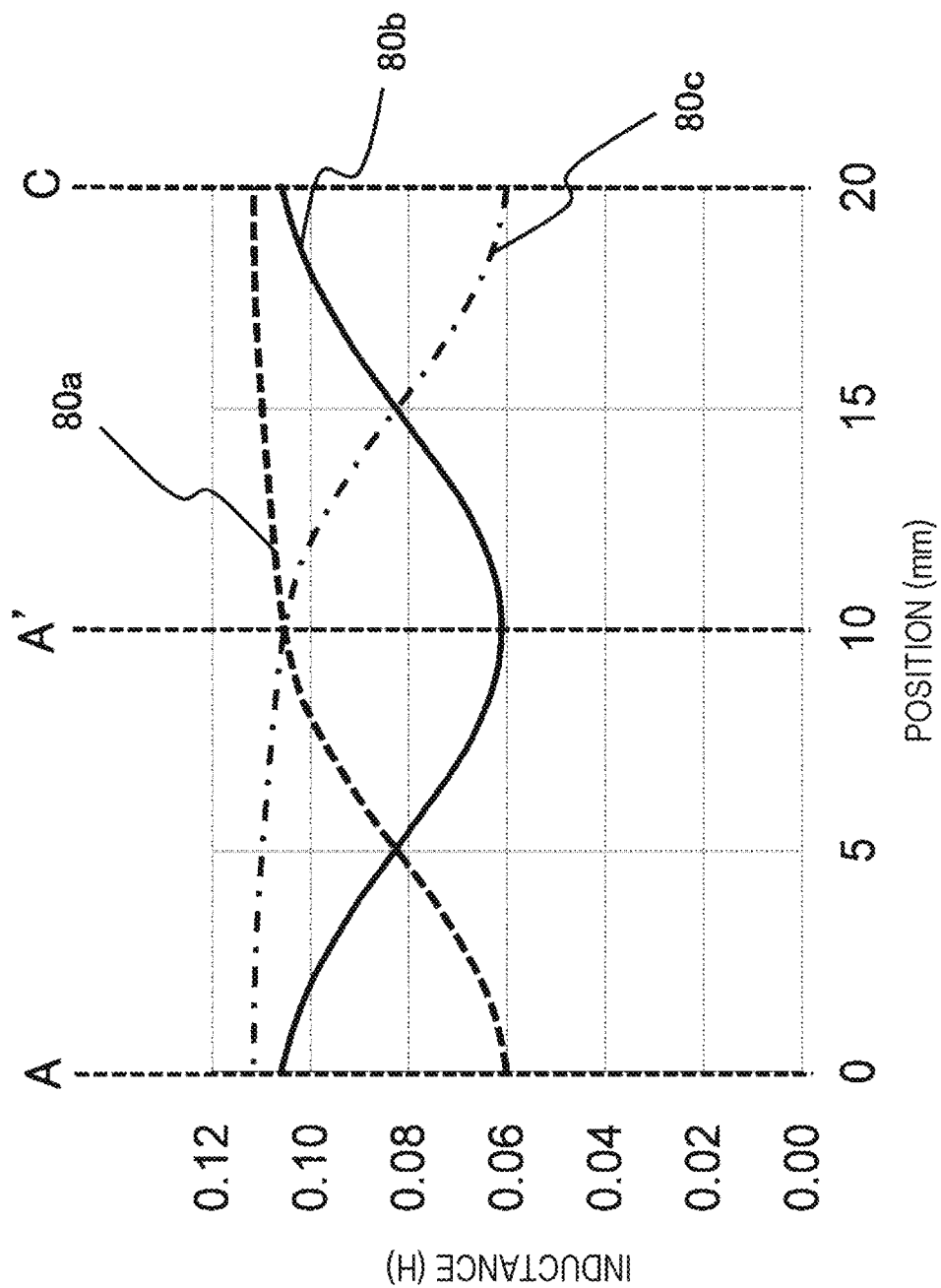
FIG. 17 is a diagram illustrating an example of inductance characteristics of a winding in the conveyance apparatus in Example 2 illustrated in FIG. 11.

FIG. 17 illustrates the result obtained by performing magnetic field analysis on the inductance characteristics of the winding 21a, the winding 21b, and the winding 21c when the permanent magnet 10A moves in order of the position A→the position A'→a position C in FIG. 11.

In FIG. 17, the inductance characteristic 80a indicates the relation between the magnet position and the inductance in the winding 21a, the inductance characteristic 80b indicates the relation between the magnet position and the inductance in the winding 21b, and the inductance characteristic 80c indicates the magnet position and the inductance in the winding 21c. These inductance characteristics are an example when the current flows so that the magnetic flux generated by the permanent magnet 10 and the magnetic flux generated by the winding have the same direction. Here, the distance between the windings is set to 10 [mm]. The position represents the position of the permanent magnet 10. It is assumed that the position 0 [mm] means that the permanent magnet is at the position A in FIG. 12 and the like, the position 10 [mm] means that the permanent magnet is at the position A', and the position 20 [mm] means that the permanent magnet is at the position C.

When the permanent magnet 10A is located at the position [mm], the inductance of the winding 21a drops, and the inductance increases as the permanent magnet moves away to the adjacent winding 21b and further to the adjacent winding 21c.

When the permanent magnet 10A moves to the position A', the inductance of the winding 21a increases, but the inductance of the winding 21b decreases and the inductance of the winding 21c decreases slightly.

Further, when the permanent magnet 10A moves to the position C, the inductance of the winding 21a gradually increases and approaches the original value. Further, the inductance of the winding 21b changes from the decrease to the increase, and the inductance of the winding 21c decreases.

As described above, it is understood that it is possible to secure the detection accuracy of the position, the movement direction, and the speed of the permanent magnet 10A by using the magnitude of the inductance of each winding, the amount of change, the slop, the ratio, and the like.

Here, the inductance of the winding 21A increases as the number of turns increases. Therefore, in order to detect the inductance with high accuracy by the amount of change in the magnetic flux of the permanent magnet 10A, it is desirable that the inductance of the winding is equal to or more than 10 [mH], and the number of turns of the winding 21A is equal to or more than 100 turns.

Figure 18:
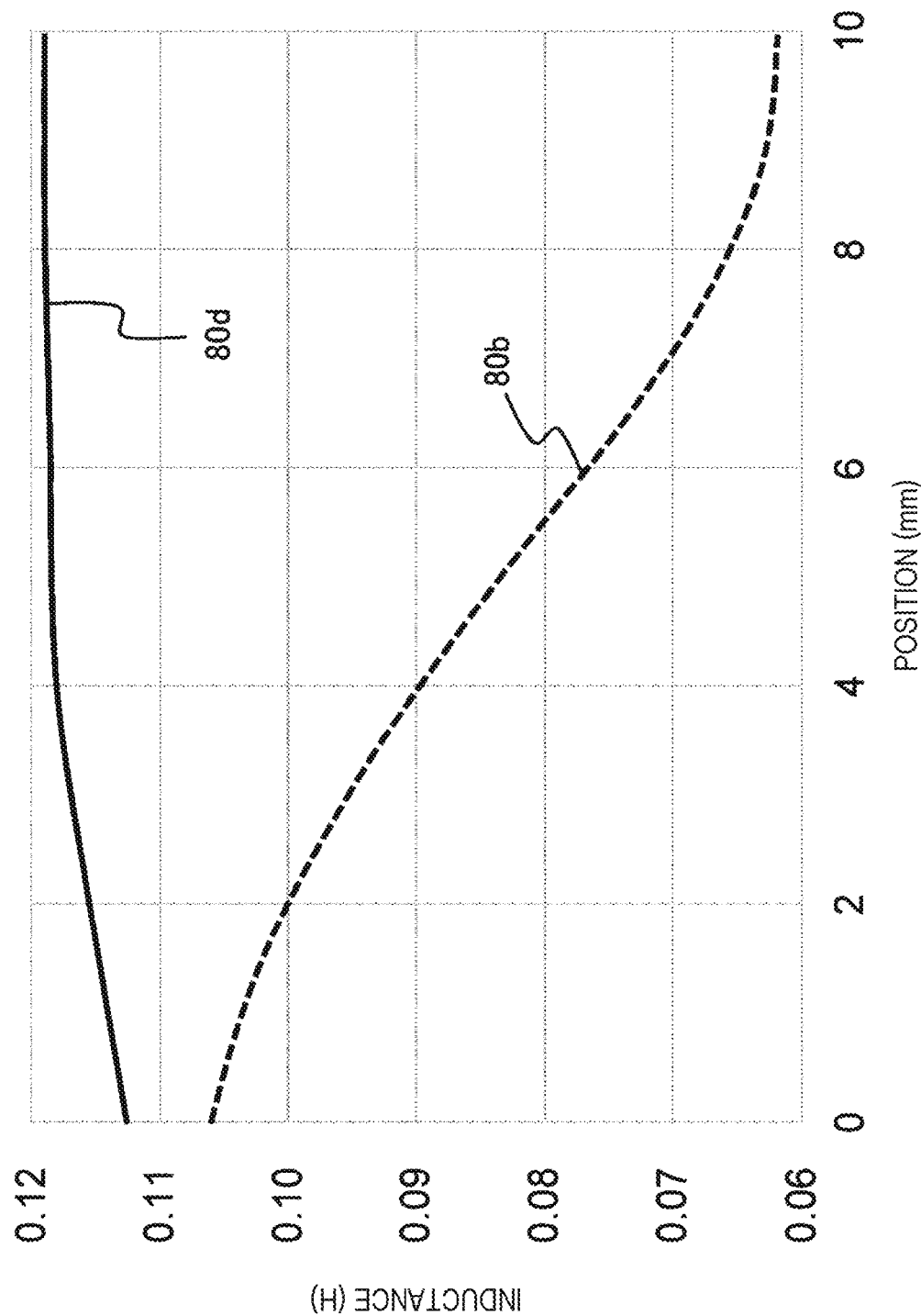
FIG. 18 is a diagram illustrating an example of the inductance characteristics in other variations of the winding in the conveyance apparatus in Example 2 illustrated in FIG. 11.

The inductance characteristics differs between a case where the current flows so that the magnetic flux generated by the permanent magnet 10A and the magnetic flux generated by the winding 21A have the same direction, and a case where the current flows so that the magnetic flux generated by the permanent magnet 10A and the magnetic flux generated by the winding 21A have opposite directions. FIG. 18 illustrates the inductance characteristics of the winding when the magnetic flux generated by the permanent magnet 10A and the magnetic flux generated by the winding have the same direction and the opposite directions.

The inductance characteristic 80b in FIG. 18 is a characteristic when the current flows so that the magnetic flux generated by the permanent magnet 10A and the magnetic flux generated by the winding 21A have the same direction, under the same condition illustrated in FIG. 17. The inductance characteristic 80d is a characteristic when the current flows so that the magnetic flux generated by the permanent magnet 10A and the magnetic flux generated by the winding 21A have the opposite directions.

As illustrated in FIG. 18, different characteristics can be obtained by changing the direction of the magnetic flux generated by the winding 21A. That is, different inductance characteristics can be obtained when the positive/negative of the applied voltage, the magnitude, the frequency, and the like of the voltage are changed. By using such information, it is possible to detect the position of the permanent magnet 10A with higher accuracy.

In the conveyance apparatus in Example 2 of the present invention, substantially similar effects to those in Example 1 described above are obtained.

Further, since at least two or more magnetic poles 25A and at least two or more current detection units 30 are provided, and the computation unit 40 computes the position of the permanent magnet 10A using the current values detected by at least two or more current detection units 30, particularly, the position of the permanent magnet 10A using the current values when the pulse voltage 60 is applied to the windings 21A wound around two adjacent cores 22A, it is possible to obtain the conveyance apparatus that has high detection accuracy and a large amount of information related to the position.

Further, when the number of turns of the winding 21A is equal to or more than 100 turns, it is possible to detect the amount of change in the inductance due to the amount of change in the magnetic flux of the permanent magnet 10A, with higher accuracy.

Note that, in the present example, a case where the prismatic core 22A and the prismatic permanent magnet 10 are used has been described as an example. The inductance may change depending on the position of the permanent magnet 10A, and the present invention is not limited to this.

By forming the permanent magnet 10 and the core 22 in a cylindrical shape as in Example 1, it is possible to make the inductance gradually change. When the inductance gradually changes, there is an advantage that it is possible to detect the position with the same accuracy regardless of the position of the permanent magnet 10.

On the other hand, by forming the permanent magnet 10A and the core 22A in a prismatic shape as in the present example, it is possible to form a steep portion and a gentle portion in the change of inductance. At steep portions, the change in inductance is large, and it is possible to improve the detection accuracy at that position.

Further, it is desirable that the difference in inductance between the case where the permanent magnet 10A is directly above and the case where the permanent magnet 10A is not around the winding 21A is equal to or more than 10 [mH]. As the difference in inductance increases, it is possible to further improve the detection accuracy of the position.

Example 3

A conveyance apparatus in Example 3 of the present invention will be described with reference to FIGS. 19 to 26.

The conveyance apparatus of the present example relates to variations in the voltage applied to the windings 21 and 21A. The basic configuration of the conveyance apparatus in the present example is similar to those in Examples 1 and 2, and details thereof will not be repeated.

Variations in the pulse voltage applied to the windings 21 and 21A in order to detect the current flowing in the windings 21 and 21A will be described below.

Firstly, the relation between the pulse voltage 60 applied to the windings 21 and 21A and the current generated in the windings 21 and 21A will be described with reference to FIG. 19.

Figure 19:
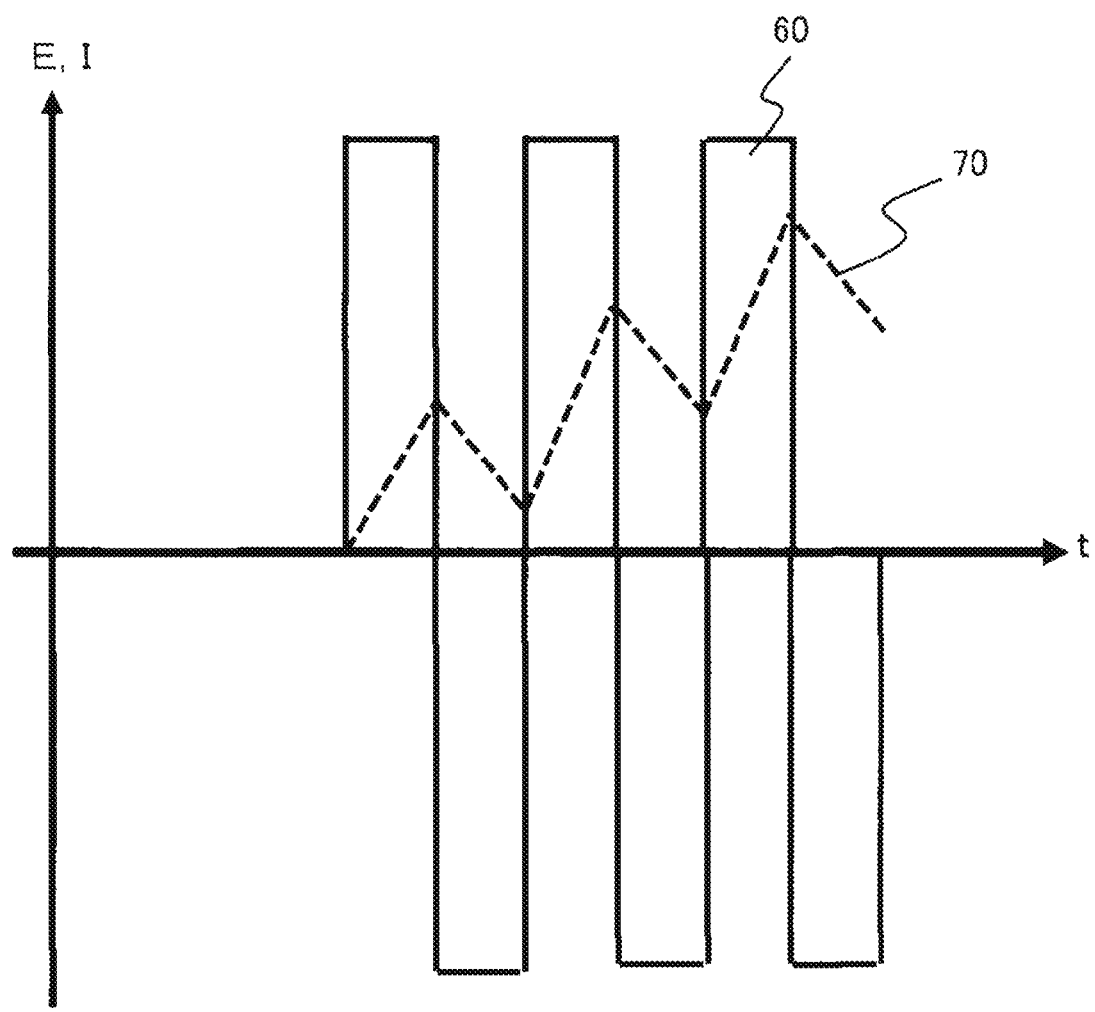
FIG. 19 is a schematic diagram illustrating a pulse voltage applied to a winding and a generated current in a conveyance apparatus in Example 3 of the present invention.

As illustrated in FIG. 19, when the pulse voltage 60 is continuously applied to the windings 21 and 21A, the inductance changes depending on the positions of the permanent magnets 10 and 10A. Thus, the slope and the shape of the current waveform 70 change. By using information of the current, the inductance is computed and the magnet position is detected.

Figure 20:
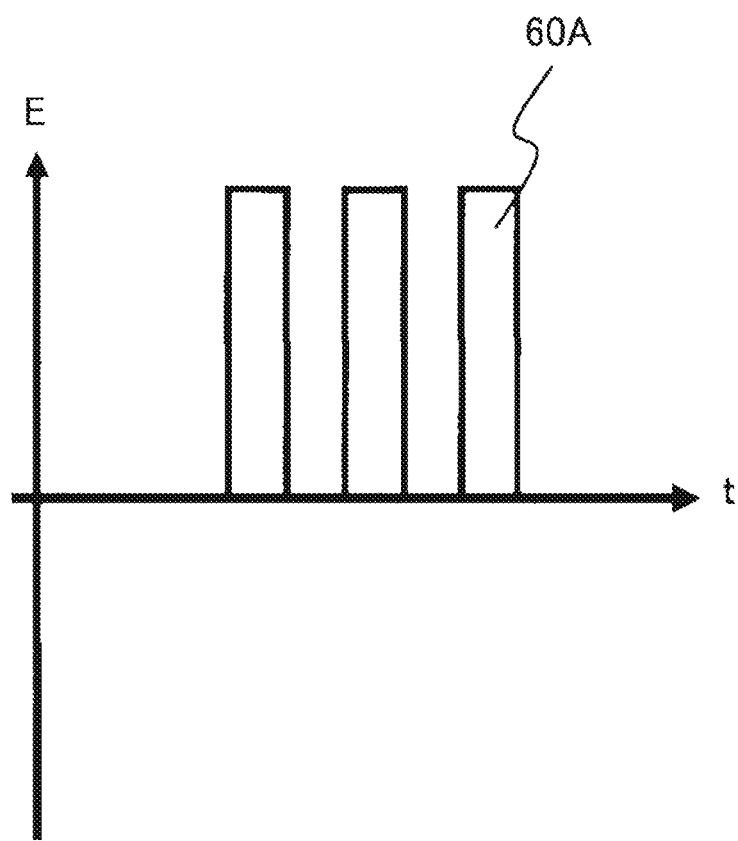
FIG. 20 is a diagram illustrating an example of a pattern of the pulse voltage applied to the winding in the conveyance apparatus in Example 3.
Figure 21:
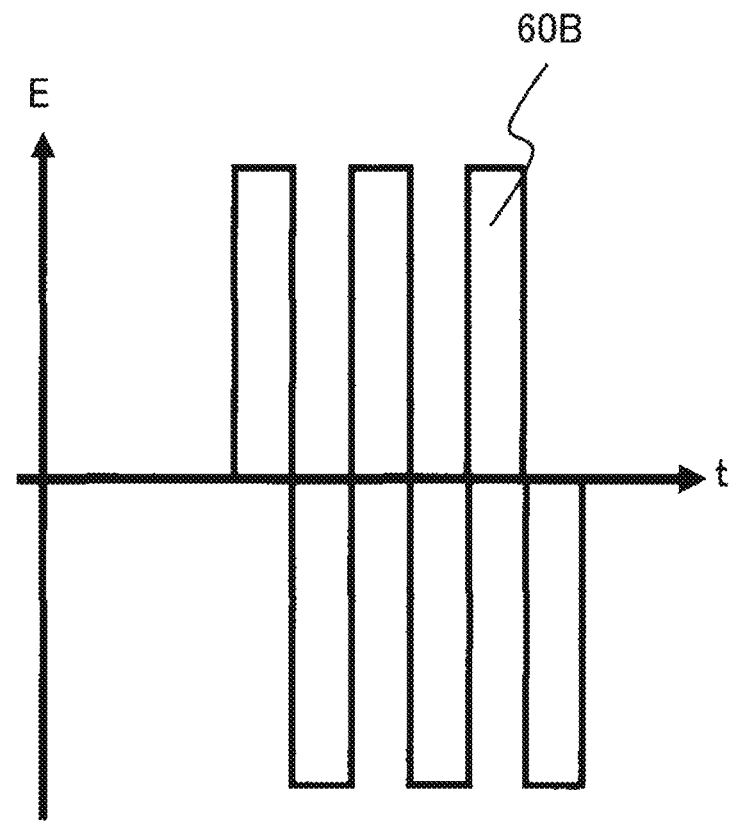
FIG. 21 is a diagram illustrating another example of the pattern of the pulse voltage applied to the winding in the conveyance apparatus in Example 3.
Figure 22:
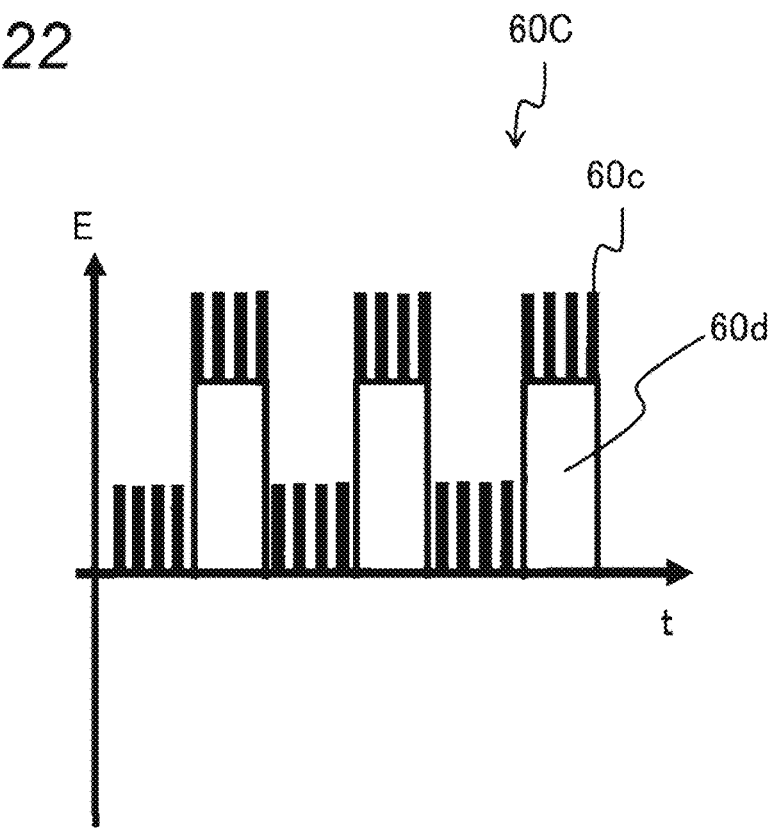
FIG. 22 is a diagram illustrating still another example of the pattern of the pulse voltage applied to the winding in the conveyance apparatus in Example 3.
Figure 23:
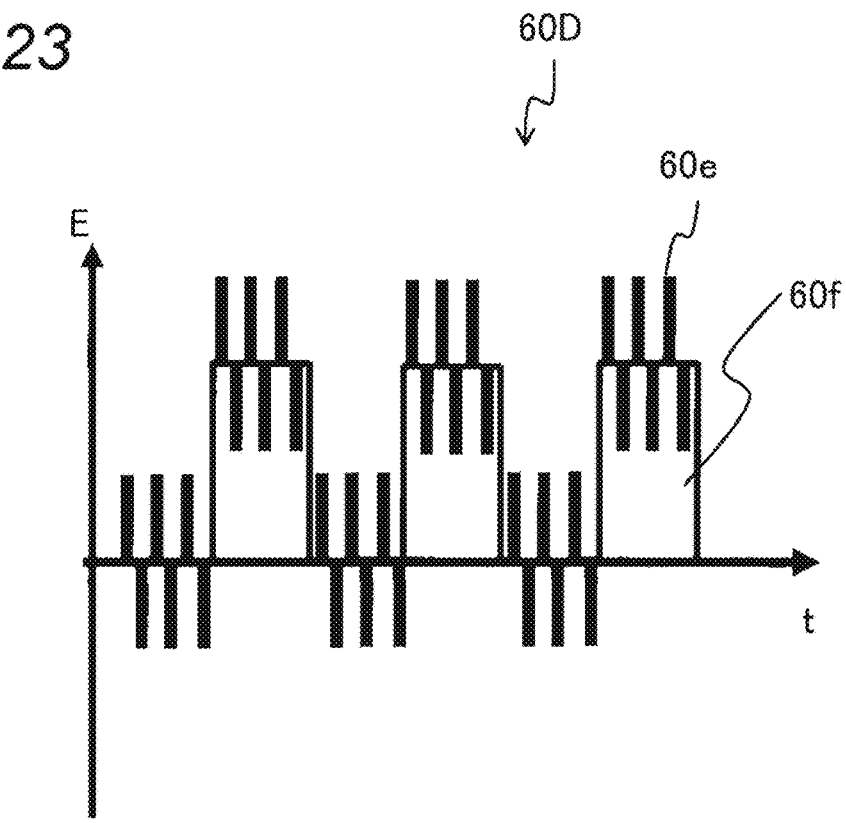
FIG. 23 is a diagram illustrating still yet another example of the pattern of the pulse voltage applied to the winding in the conveyance apparatus in Example 3.

FIGS. 20 to 23 illustrate patterns of applying the pulse voltage. FIGS. 20 and 21 illustrate examples of the pulse voltage applied when the permanent magnets 10 and 10A are stationary. FIGS. 22 and 23 are examples of the pulse voltage applied when the positions of the permanent magnets 10 and 10A are changing from moment to moment.

FIG. 20 illustrates a pattern in which only a positive pulse voltage 60A is applied.

FIG. 21 illustrates a pattern in which a positive/negative pulse voltage 60B is applied. As described above, when the drive circuit 50 is controlled to apply the positive/negative pulse voltage 60B by the computation unit 40, it is possible to change the direction of the magnetic flux generated by the windings 21 and 21A and to further improve the detection accuracy.

Here, as described above, it is necessary to apply a voltage to the windings 21 and 21A in order to generate an electromagnetic force for driving the permanent magnets 10 and 10A. Therefore, the position detection pulse voltage can be superimposed on the drive voltage or the pulse voltage. Here, it is desirable that the frequency of the position detection pulse voltage is set to have a different value from the frequency of the drive pulse voltage. In the steady state, desirably, the drive pulse voltage causes the current changes at a high frequency, so that the drive pulse voltage may be set to a high frequency, and the position detection pulse voltage may be set to a low frequency.

FIG. 22 illustrates an example of a waveform when the conveyance target object is moved intermittently. Further, a pulse voltage 60C illustrated in FIG. 22 is obtained by superimposing a position detection pulse voltage 60c on a drive pulse voltage 60d. Generally, the drive pulse voltage 60 is generated by pulse width modulation (PWM) or the like. The average voltage is changed by changing the width of a voltage pulse having a high frequency such as 10000 [Hz]. Further, FIG. 22 illustrates an example in which the drive pulse voltage 60d is intermittently applied to intermittently operate the conveyance target object.

The drive pulse voltage 60d generates the thrust for moving the permanent magnet 10 around the winding.

It is desirable that the position detection pulse voltage 60c is set to have a frequency different from that of the drive pulse voltage 60d. The drive pulse voltage 60d is generated by PWM modulation or the like, and is generated by changing the pulse width of, for example, about 10000 [Hz] in the steady state. In particular, it is desirable that the drive pulse voltage 60d has a higher frequency than the position detection pulse voltage 60c, and the magnitude of the voltage is equal to or greater than the magnitude of the position detection pulse voltage.

FIG. 23 illustrates an example of a waveform when the conveyance target object is moved intermittently. Further, a pulse voltage 60D illustrated in FIG. 23 is obtained by superimposing a positive/negative position detection pulse voltage 60e on a drive pulse voltage 60f.

Also in the pulse voltage 60D as illustrated in FIG. 23, it is desirable that the position detection pulse voltage 60e generated by PWM modulation or the like in the steady state has a lower frequency than the drive pulse voltage 60f, and the magnitude of the voltage is equal to or smaller than the magnitude of the drive pulse voltage.

Note that, the drive voltage does not need to be a voltage having a periodic waveform such as the pulse voltages 60d and 60f as illustrated in FIGS. 22 and 23, and may be aperiodic.

Further, it is desirable that the frequency of the drive pulse voltage 60d or 60f generated by PWM modulation or the like is five times or more the frequency of the position detection pulse voltage 60c or 60e.

Figure 24:
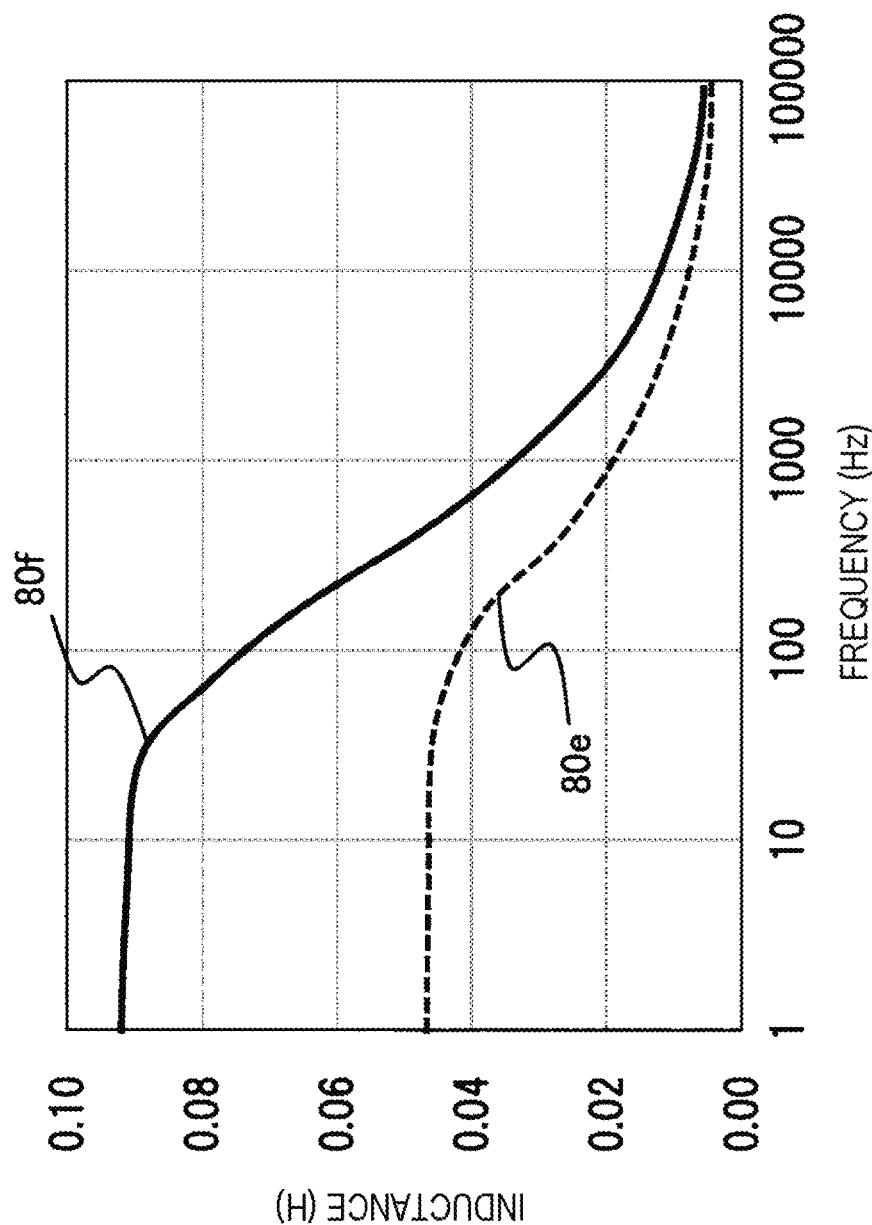
FIG. 24 is a diagram illustrating a frequency of a position detection pulse voltage applied to the winding and inductance characteristics in the conveyance apparatus in Example 3.

FIG. 24 illustrates the relation between the frequency of the position detection pulse voltage applied to the windings 21 and 21A and the inductance characteristics.

In FIG. 24, the relation between the inductance and the frequency of the pulse voltage applied when the permanent magnets 10 and 10A are not near the windings 21 and 21A is indicated by the inductance characteristic 80f, and the relation between the inductance and the frequency of the pulse voltage applied when the permanent magnets 10 and 10A are directly above the windings 21 and 21A is indicated by the inductance characteristic 80e.

As illustrated in FIG. 24, as the frequency of the pulse voltage increases, the difference in inductance between the case where the permanent magnets 10 and 10A are not near the windings 21 and 21A, and the case where the permanent magnets 10 and 10A are directly above the windings 21 and 21A decreases.

That is, since the inductance of the windings 21 and 21A changes depending on the frequency, in order to reliably secure the difference in inductance required for position detection of the permanent magnets 10 and 10A by 0.01 [mH] or more, it is desirable that the frequency of the position detection pulse voltage is equal to or less than 10000 [Hz]. Normally, the drive pulse generated by PWM modulation or the like is applied at 10000 [Hz] or higher. In addition, since the electrical cycle (drive frequency) of driving the conveyance target object is normally driven at intervals of 10 to 100 [Hz] or lower, it is desirable that the frequency of the position detection pulse voltage is set to be equal to or higher than 100 [Hz]. More desirably, it is desirable to set the frequency between 1000 and 2000 [Hz].

In the conveyance apparatus in Example 3 of the present invention, substantially similar effects to those in Examples 1 and 2 described above are obtained.

Further, by setting the pulse voltages 60C and 60D applied from the drive circuit 50 to have at least two or more different frequencies, it is possible to perform both the conveyance and the position detection even while the conveyance target object is being conveyed.

Further, among the pulse voltages 60 having different frequencies applied by the drive circuit 50, the frequency of the pulse voltage 60 having the highest frequency is set to five times or more higher than the frequency of the pulse voltage 60 having the lowest frequency, so that it is possible to suppress the driving of the permanent magnets 10 and 10A side by the position detection pulse voltage 60e and to suppress problems such as vibration, pulsation, and noise.

Further, when the computation unit 40 controls the drive circuit 50 to apply the positive/negative pulse voltages 60B and 60D, it is possible to change the direction of the magnetic flux generated by the windings 21 and 21A and to further improve the detection accuracy.

Further, among the pulse voltages 60 applied by the drive circuit 50, the pulse voltages 60c and 60e applied to compute the position of the permanent magnet 10 are set to have a frequency equal to or lower than a drive frequency generated by the drive pulse voltages 60d and 60f used for driving the permanent magnet 10. Thus, it is possible to suppress an occurrence of a situation in which a drive force acts on the permanent magnets 10 and 10A by the position detection pulse voltages 60c and 60e to cause vibration and pulsation.

In addition, among the pulse voltages 60 applied by the drive circuit 50, the frequency of the pulse voltages 60c and 60e applied to compute the position of the permanent magnet 10 is set to be equal to or lower than 10000 [Hz]. Thus, it is possible to secure a large difference in the absolute value of the inductance when the distances to the permanent magnets 10 and 10A are different, and to secure high position detection accuracy.

Furthermore, the frequency of the pulse voltages 60c and 60e applied to compute the position of the permanent magnet 10 is set to be equal to or higher than 100 [Hz], so that it is possible to clearly separate the drive voltage and the position detection pulse voltage from each other, to reliably secure the high position detection accuracy, and to further suppress cause of vibration and pulsation.

Figure 25:
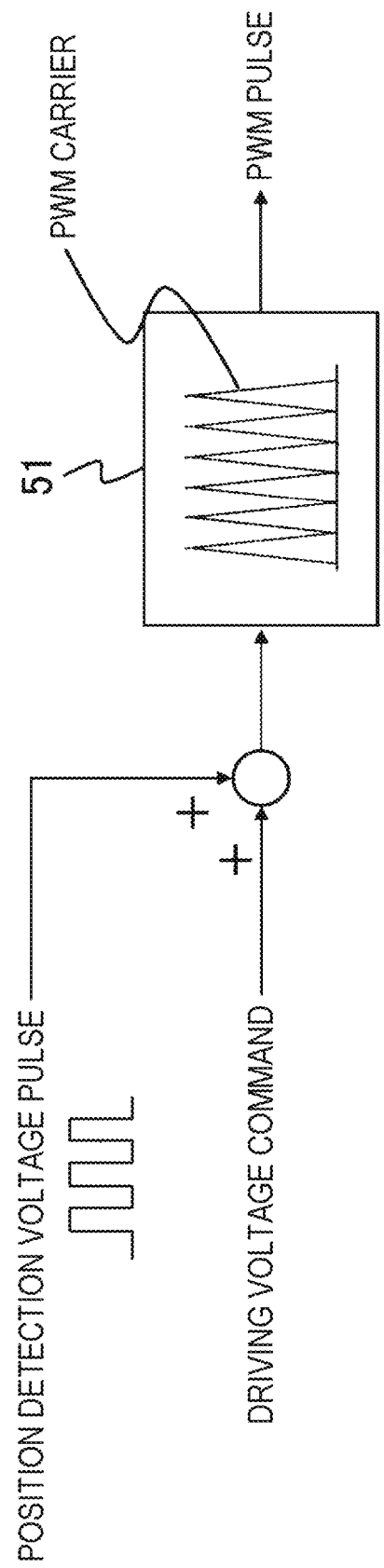
FIG. 25 is a diagram illustrating an example of a PWM control method of generating a voltage pulse in the conveyance apparatus in Example 3.

Regarding the method of generating the position detection voltage pulse and the drive voltage pulse in the drive circuit 50 described above, when a PWM control method that is commonly used is used, it is possible to apply the voltage pulse to the coil with high accuracy. FIG. 25 illustrates the method of generating the PWM pulse at this time.

As illustrated in FIG. 25, the above-described position detection pulse is added to a drive voltage command to compute the final voltage command. Further, the voltage command is compared with a PWM carrier in a triangular wave comparison unit 51. A PWM pulse is generated by comparing the magnitude with the PWM carrier. Although not illustrated here, the generated PWM pulse is input to the drive circuit 50 as an electric signal. Actually, a voltage pulse along the PWM pulse is generated and applied to the coil. With this operation, a current corresponding to the final voltage command obtained by adding the above-described drive voltage command and the position detection pulse flows in the coil. Further, it is possible to detect the above-described change in inductance by the change in coil current in accordance with the position detection pulse generated here.

Figure 26:
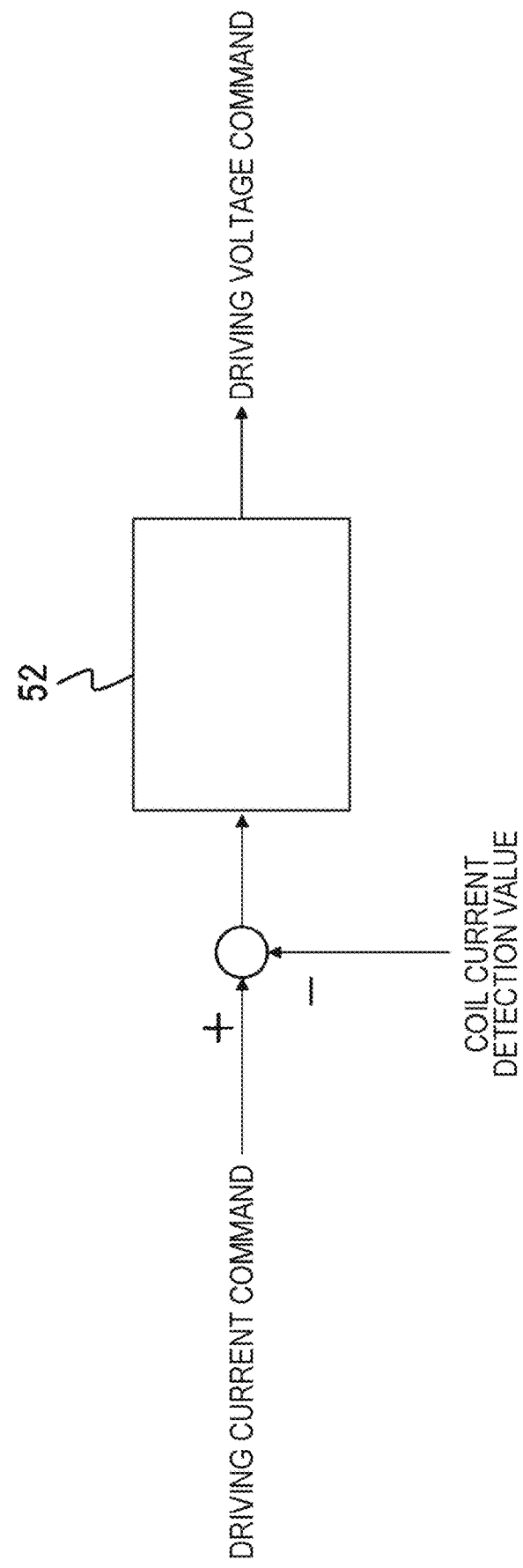
FIG. 26 is a diagram illustrating an example of a current control method of controlling a coil current in the conveyance apparatus in Example 3.

Note that, a method of computing the drive voltage command is not particularly limited, and a general current control method can be used. FIG. 26 illustrates an example of the current control method. The current control method illustrated in FIG. 26 is a current feedback control method. The difference between the command value of the drive current flowing in the coil and the detected value of the coil current is computed, and the value is input to a current controller 52 configured by proportional integration or the like to compute the drive voltage command.

When the current control method described here and the PWM control method are used, it is possible to generate any coil current with high accuracy. Further, since it is possible to freely change the frequency and the amplitude of the position detection voltage pulse for detecting the inductance of the coil, it is possible to adjust the voltage pulse in accordance with the position detection accuracy and noise.

Example 4

An example of a sample analysis system and a sample preprocessing apparatus including a conveyance apparatus in Example 4 of the present invention will be described with reference to FIGS. 27 and 28. Firstly, the overall configuration of a sample analysis system 100 will be described with reference to FIG. 27. FIG. 27 is a schematic diagram illustrating the overall configuration of the sample analysis system 100.

In FIG. 27, the sample analysis system 100 is an apparatus that dispenses a sample and a reagent into a reaction vessel and causes a reaction, and then measures the liquid subjected to the reaction. The sample analysis system includes a carry-in unit 101, an emergency rack loading port 113, and a conveyance line 102, a buffer 104, an analysis unit 105, a storage unit 103, a display unit 118, a control unit 120, and the like.

The carry-in unit 101 is a place where a sample rack 111 for storing a plurality of sample containers 122 for containing biological samples such as blood and urine is installed. The emergency rack loading port 113 is a place for loading the sample rack (carry black) on which the standard solution is mounted and the sample rack 111 for storing the sample container 122 containing the sample that requires urgent analysis into the apparatus.

The buffer 104 holds a plurality of sample racks 111 conveyed by the conveyance line 102 so that the dispensing order of the samples in the sample rack 111 can be changed.

The analysis unit 105 analyzes the sample conveyed from the buffer 104 via the conveyor line 106. The details will be described later.

The storage unit 103 stores the sample rack 111 containing the sample container 122 that holds the sample that has been analyzed by the analysis unit 105.

The conveyance line 102 is a line for conveying the sample rack 111 installed in the carry-in unit 101, and has the same configuration as any of the conveyance apparatus described in Examples 1 to 3 described above. In the present example, the magnetic body, preferably, the permanent magnet is provided on the back surface side of the sample rack 111.

The analysis unit 105 includes a conveyor line 106, a reaction disc 108, a sample dispensing nozzle 107, a reagent disc 110, a reagent dispensing nozzle 109, a cleaning mechanism 112, a reagent tray 114, a reagent ID reader 115, a reagent loader 116, and a spectrophotometer 121, and the like.

The conveyor line 106 is a line for carrying the sample rack 111 in the buffer 104 into the analysis unit 105, and has the same configuration as the conveyance apparatus described in Examples 1 to 3 described above.

The reaction disc 108 includes a plurality of reaction vessels. The sample dispensing nozzle 107 dispenses the sample from the sample container 122 to a reaction container of the reaction disc 108 by rotational driving or vertical driving. A plurality of reagents are erected on the reagent disc 110. The reagent dispensing nozzle 109 dispenses reagents from a reagent bottle in the reagent disc 110 into the reaction vessel of the reaction disc 108. The cleaning mechanism 112 cleans the reaction vessel of the reaction disc 108. The spectrophotometer 121 measures the absorbance of the reaction solution by measuring the transmitted light obtained from a light source (not illustrated) through the reaction solution in the reaction vessel.

The reagent tray 114 is a member for installing a reagent when the reagent is registered in the sample analysis system 100. The reagent ID reader 115 is a device for acquiring reagent information by reading a reagent ID attached to the reagent installed in the reagent tray 114. The reagent loader 116 is a device that carries reagents into the reagent disc 110.

The display unit 118 is a display device for displaying the analysis result of the concentration of a predetermined component in a liquid sample such as blood or urine.

The control unit 120 is configured by a computer or the like. The control unit controls the operation of each mechanism in the sample analysis system 100, and performs computation processing for obtaining the concentration of a predetermined component in the sample such as blood and urine.

The above description is for the overall configuration of the sample analysis system 100.

The analysis processing of the sample by the sample analysis system 100 as described above is generally performed in the following order.

Firstly, the sample rack 111 is installed in the carry-in unit 101 or the emergency rack loading port 113, and is carried into the buffer 104 that can be randomly accessed, by the conveyance line 102.

In the sample analysis system 100, the sample rack 111 having the highest priority among the racks stored in the buffer 104 is carried into the analysis unit 105 by the conveyor line 106, in accordance with the priority rule.

The sample rack 111 arriving at the analysis unit 105 is further transferred to a sample distribution position near the reaction disc 108 by the conveyor line 106, and the sample is distributed into the reaction vessel of the reaction disc 108 by the sample dispensing nozzle 107. The sample is distributed as many times as necessary by the sample dispensing nozzle 107 in accordance with the analysis items requested for the sample.

The sample is distributed into all the sample containers 122 mounted on the sample rack 111, by the sample dispensing nozzle 107. The sample rack 111 on which the distribution processing into all the sample containers 122 is ended is transferred to the buffer 104 again. Further, the sample rack 111 on which the entirety of the distribution processing including the automatic re-examination is ended is transferred to the storage unit 103 by the conveyor line 106 and the conveyance line 102.

In addition, the reagent used for analysis is distributed into the reaction vessel into which the sample is distributed in advance by the reagent dispensing nozzle 109 from the reagent bottle on the reagent disc 110. Then, a stirring mechanism (not illustrated) is used to stir the liquid mixture of the sample and the reagent in the reaction vessel.

Then, light generated from the light source is transmitted through the reaction vessel containing the liquid mixture after stirring, and the luminous intensity of the transmitted light is measured by the spectrophotometer 121. The luminous intensity measured by the spectrophotometer 121 is transmitted to the control unit 120 via the A/D converter and the interface. Then, a computation is performed by the control unit 120 to obtain the concentration of a predetermined component in a liquid sample such as blood or urine, and the result is displayed on the display unit 118 or the like or stored in a storage unit (not illustrated).

Note that, as illustrated in FIG. 27, the sample analysis system 100 does not need to have all the above-described components, and can be obtained by adding a preprocessing unit as appropriate, or deleting some units or some components. Further, the analysis unit 105 is not limited to the biochemical analysis, and may be for the immunoassay, and it is not necessary to have one, and two or more may be provided. Also in this case, the analysis unit 105 and the carry-in unit 101 are connected by the conveyance line 102, and the sample rack 111 is conveyed from the carry-in unit 101.

Next, the overall configuration of a sample preprocessing apparatus 150 will be described with reference to FIG. 28. FIG. 28 is a schematic diagram illustrating the overall configuration of the sample preprocessing apparatus 150.

Figure 28:
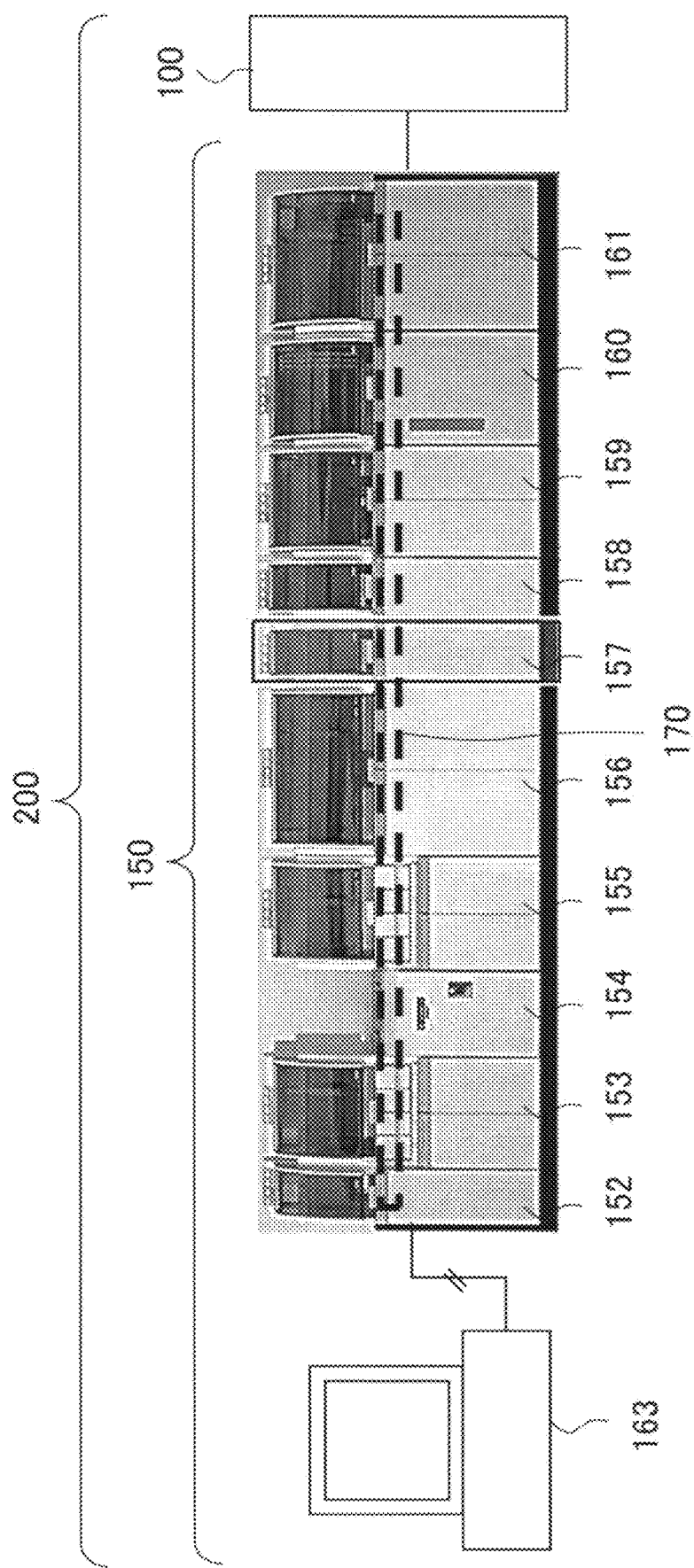
FIG. 28 is a diagram illustrating an example of a sample preprocessing apparatus in Example 4 of the present invention.

In FIG. 28, the sample preprocessing apparatus 150 is an apparatus that performs various kinds of preprocessing necessary for sample analysis. The apparatus includes, from the left side to the right side in FIG. 28, a plurality of units including a closing unit 152, a sample storage unit 153, an empty holder stacker 154, a sample putting unit 155, a centrifuge unit 156, a liquid amount measuring unit 157, an opening unit 158, a child sample container preparation unit 159, a dispensing unit 165, and a transfer unit 161 as basic elements, a conveyance apparatus 170, and an operation unit PC 163 that controls operations of the plurality of units.

The sample analysis system 100 for performing qualitative and quantitative analysis of the components of the sample is connected as a transfer destination of the sample processed by the sample preprocessing apparatus 150.

The sample putting unit 155 is a unit for putting the sample container 122 containing the sample into the sample preprocessing apparatus 150. The centrifuge unit 156 is a unit for centrifuging the put sample container 122. The liquid amount measuring unit 157 is a unit for measuring the liquid amount of the sample contained in the sample container 122. The opening unit 158 is a unit for opening a plug of the put sample container 122. The child sample container preparation unit 159 is a unit that performs preparations necessary for dispensing the sample contained in the put sample container 122 in the next dispensing unit 165. The dispensing unit 165 is a unit that subdivides the centrifuged sample for analysis by a sample analysis system or the like, and attaches a barcode or the like to the subdivided sample container 122 or child sample container 122. The transfer unit 161 is a unit that classifies the dispensed child sample containers 122 and prepares the transfer to the sample analysis system. The closing unit 152 is a unit that closes a plug to the sample container 122 or the child sample container 122. The sample storage unit 153 is a unit that stores the closed sample container 122.

The conveyance apparatus 170 is a mechanism for conveying a sample rack or a sample holder that holds the sample container 122 between each of the units or between the sample preprocessing apparatus 150 and the sample analysis system 100. As the conveyance apparatus 170, the conveyance apparatus in any of Examples 1 to 3 is used.

Note that, the sample preprocessing apparatus 150 does not need to have all the above-described components. Units can be further added, or some units or some components can be deleted.

Further, the sample analysis system in the present example may be a sample analysis system 200 configured by the sample preprocessing apparatus 150 and the sample analysis system 100 as illustrated in FIG. 28. In this case, the sample container 122 can be conveyed not in only each system, but by connecting the systems by the conveyance apparatuses 1 and 1A in Examples 1 to 3 described above.

The sample analysis systems 100 and 200 and the sample preprocessing apparatus 150 in Example 4 of the present invention include the conveyance apparatuses 1 and 1A in Example 1 described above. Thus, it is possible to convey the sample container 122 to the conveyance destination with high efficiency, and to reduce the time taken to obtain the analysis result. In addition, it is possible to reduce conveyance troubles, and to reduce the burden on the test technician.

Note that, in the present example, the case where the sample rack 111 holding five sample containers 122 containing the sample is conveyed as a conveyance target has been described. In addition to the sample rack 111 holding five sample containers 122, a sample holder that holds one sample container 122 can be conveyed as the conveyance target.

<Others>

Note that, the present invention is not limited to the above examples, and various modification examples may be provided. The above embodiments are described in detail in order to explain the present invention in an easy-to-understand manner, and the above embodiments are not necessarily limited to a case including all the described configurations.

Further, some components in one embodiment can also be replaced with the components in another embodiment, and the configuration of another embodiment can be added to the configuration of one embodiment. Regarding some components in the examples, other components can also be added, deleted, and replaced.

For example, in Examples 1 to 4, the case where the conveyance target object to be conveyed by the conveyance apparatus is the sample rack 111 or the sample holder has been described, but the conveyance target object is not limited to the rack, the holder, and the like that hold the sample container 122. Various objects that are required to be conveyed on a large scale can be conveyed.

REFERENCE SIGNS LIST 1, 1A conveyance apparatus
10, 10A permanent magnet (first magnetic body)
21, 21A, 21$a$, 21$b$, 21$c$ winding
22, 22A, 22$a$, 22$b$ core (second magnetic body)
23 A yoke
25, 25A magnetic pole (magnetic circuit)
30 current detection unit
31 resistor
40 computation unit
50 drive circuit
51 triangular wave comparison unit
52 current controller
55 power supply
60, 60A, 60B, 60C, 60D pulse voltage
60$c$, 60$e$ position detection pulse voltage
60$d$, 60$f$ drive pulse voltage
70, 70$a$, 70$b$ current waveform
80$a$, 80$b$, 80$c$, 80$d$, 80$e$, 80$f$ inductance characteristics
100 sample analysis system
101 carry-in unit
102 conveyance line
103 storage unit
104 buffer
105 analysis unit
106 conveyor line
107 sample dispensing nozzle
108 reaction disc
109 reagent dispensing nozzle
110 reagent disc
111 sample rack (conveyance target object)
112 cleaning mechanism
113 emergency rack loading port
114 reagent tray
115 reader
116 reagent loader
118 display unit
120 control unit
121 spectrophotometer
122 sample container, child sample container
150 sample preprocessing apparatus
152 closing unit
153 sample storage unit
154 holder stacker
155 sample putting unit
156 centrifuge unit
157 liquid volume measuring unit
158 opening unit
159 child sample container preparation unit
161 transfer unit
163 operation unit PC
165 dispensing unit
170 conveyance apparatus
200 sample analysis system

The invention claimed is:

1. A conveyance apparatus comprising:
a first magnetic body that is provided on a conveyance target object side;
two or more magnetic circuits, each including a core formed of a second magnetic body and a winding wound around an outer periphery of the core;
two or more drive circuits that are provided to correspond to the magnetic circuits one by one, each supplying a current to the winding;
two or more current detection units, each detecting a value of a current flowing in the winding; and
a computation unit that computes a position of the first magnetic body based on the current value detected by each of the current detection units, and controls the current supplied from each of the drive circuits to the winding on the basis of position information of the first magnetic body obtained by the computation,
wherein each of the current detection units is a resistor connected to the winding, and the computation unit
controls the drive circuit to apply a pulse voltage having at least two or more different frequencies and detects a current from a voltage value of the resistor,
sets the pulse voltage applied to compute the position of the first magnetic body in the pulse voltage applied by the drive circuit, to be equal to or lower than a voltage used to drive the first magnetic body,
stores, in advance, a relational expression for determining a relation between a current waveform generated by the pulse voltage, and a distance, or table data for determining the relation between the current waveform and the distance, and
detects inductance from the current waveform and computes the position of the first magnetic body from any one or more of a difference in inductance between the adjacent windings, a slope of the inductance of each of the windings, and a value of the inductance.

2. The conveyance apparatus according to claim 1, wherein the computation unit computes the position of the first magnetic body from a rising time of the current waveform.

3. The conveyance apparatus according to claim 1, wherein the frequency of the pulse voltage having a highest frequency in the pulse voltage that is applied by the drive circuit and has the different frequencies is set to be equal to or more than five times the frequency of the pulse voltage having a lowest frequency.

4. The conveyance apparatus according to claim 1, wherein the computation unit controls the drive circuit to apply positive and negative pulse voltages.

5. The conveyance apparatus according to claim 1, wherein a frequency of the pulse voltage applied to compute the position of the first magnetic body in the pulse voltage applied by the drive circuit is set to be equal to or less than 10000 Hz.

6. The conveyance apparatus according to claim 5, wherein the frequency of the pulse voltage applied to compute the position of the first magnetic body is set to be equal to or more than 100 Hz.

7. The conveyance apparatus according to claim 1, wherein the computation unit computes the position of the first magnetic body by using the current value when the pulse voltage is applied to the windings wound around the two adjacent cores.

8. The conveyance apparatus according to claim 1, wherein a gap between the first magnetic body and the core is equal to or less than 10 mm.

9. The conveyance apparatus according to claim 1, wherein a number of turns of the winding is equal to or more than 100 turns.

10. The conveyance apparatus according to claim 1, wherein the first magnetic body is a permanent magnet.

11. A sample analysis system comprising:
the conveyance apparatus according to claim 1.

12. A sample preprocessing apparatus comprising:
the conveyance apparatus according to claim 1.

13. The conveyance apparatus according to claim 1, wherein the computation unit stores, in advance, any one or more of the relation between the inductance and the distance and information for determining a relation between a rising time of the current and the distance, as the relational expression, and information for determining the relation between the inductance and the distance and the information for determining the relation between the rising time of the current and the distance, as the table data.

* * * * *